United States Patent
Khan et al.

(10) Patent No.: US 11,422,218 B2
(45) Date of Patent: Aug. 23, 2022

(54) RECONFIGURATION OF A RADIO POSITIONING SUPPORT SYSTEM

(71) Applicant: HERE Global B.V., Eindhoven (NL)

(72) Inventors: Muhammad Irshan Khan, Tampere (FI); Jari Tapani Syrjärinne, Tampere (FI)

(73) Assignee: HERE Global B.V., Eindhoven (NL)

(*) Notice: Subject to any disclaimer, the term of this patent is extended or adjusted under 35 U.S.C. 154(b) by 207 days.

(21) Appl. No.: 16/638,490

(22) PCT Filed: Aug. 14, 2017

(86) PCT No.: PCT/EP2017/070624
§ 371 (c)(1),
(2) Date: Feb. 12, 2020

(87) PCT Pub. No.: WO2019/034237
PCT Pub. Date: Feb. 21, 2019

(65) Prior Publication Data
US 2021/0373110 A1    Dec. 2, 2021

(51) Int. Cl.
*G01S 1/04* (2006.01)
*G01S 1/02* (2010.01)

(52) U.S. Cl.
CPC ............ *G01S 1/0423* (2019.08); *G01S 1/024* (2013.01)

(58) Field of Classification Search
None
See application file for complete search history.

(56) References Cited

U.S. PATENT DOCUMENTS

| 7,567,822 B2 | 7/2009 | Hart et al. |
| 8,743,759 B2 | 6/2014 | Viswanathan et al. |

(Continued)

FOREIGN PATENT DOCUMENTS

| EP | 2 730 106 | 8/2016 |
| WO | WO 2012/032376 A1 | 3/2005 |

(Continued)

OTHER PUBLICATIONS

Office Action for European Application No. 17751769.5 dated Jun. 1, 2021, 4 pages.

(Continued)

*Primary Examiner* — Whitney Moore
(74) *Attorney, Agent, or Firm* — Alston & Bird LLP

(57) ABSTRACT

A method, apparatus and computer readable storage medium are provided for reconfiguring a radio positioning support system. In a method, one or more observation reports are received. Each observation report is associated with a respective radio positioning support device of a radio positioning support system. Each observation report contains an indication for a number of radio positioning support devices and/or for each radio positioning support device from which a radio positioning support signal is observable at a position of said respective radio positioning support device. The method also determines, based on said observation reports, whether a predetermined radio positioning support criterion is met by said radio positioning support system. If it is determined that the predetermined radio positioning support criterion is not met by the radio positioning support system, the method at least partially reconfigures and/or causes at least partially reconfiguration of the radio positioning support system.

20 Claims, 9 Drawing Sheets

(56) References Cited

U.S. PATENT DOCUMENTS

| | | |
|---|---|---|
| 8,831,594 B2 | 9/2014 | Naguib et al. |
| 8,996,000 B2 | 3/2015 | Henderson et al. |
| 9,544,978 B2 | 1/2017 | Mohan et al. |
| 2015/0036517 A1* | 2/2015 | Ruutu .................. H04W 24/10 370/252 |

FOREIGN PATENT DOCUMENTS

| | | |
|---|---|---|
| WO | WO 2012/052700 A1 | 4/2012 |
| WO | WO 2013/005081 A1 | 1/2013 |
| WO | WO 2014/128534 A1 | 8/2014 |
| WO | WO 2016/087008 A1 | 6/2016 |

OTHER PUBLICATIONS

International Search Report and Written Opinion for Application No. PCT/EP2017/070624 dated May 4, 2018, 11 pages.
Atia, M. M., *Dynamic Online-Calibrated Radio Maps for Indoor Positioning in Wireless Local Area Networks*, (Sep. 2013) 1774-1787.
Bernardos, A. M. et al., *Real Time Calibration for RSS Indoor Positioning Systems*, 2010 International Conference on Indoor Positioning and Indoor Navigation (Sep. 2010) 7 pages.

\* cited by examiner

RECONFIGURATION OF A RADIO POSITIONING SUPPORT SYSTEM

CROSS-REFERENCE TO RELATED APPLICATIONS

This application is a national phase entry of International Application No. PCT/EP2017/070624, filed Aug. 14, 2017, the entire contents of which are incorporated herein by reference.

FIELD OF THE DISCLOSURE

The invention relates to the field of radio positioning support systems and more specifically to reconfiguring a radio positioning support system or reconfiguration of a radio positioning support system.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A Bluetooth based positioning solution such as a self-contained positioning system, for instance, may be divided in at least three stages, an installation stage, a training stage and a positioning stage.

In the installation stage, Bluetooth beacons are installed in the environment for which a positioning solution is to be provided.

In the subsequent training stage, learning data are collected. The data may be collected in the form of fingerprint observation reports that are based on measurements by mobile devices. A fingerprint observation report may contain a location estimate and measurements taken from the radio interface. The location estimate may be for example GNSS based, sensor-based, or manually inputted. Measurements taken from the radio interface may comprise, by way of example, measured radio signal strengths and an identification of Bluetooth beacons transmitting the radio signals. The training may be a continuous background process, in which mobile devices of a large number of consumers are continuously observation reporting measured data to a server. Consumers may consent to a participation in such a data collection, if their device is equipped with the needed functionality. This approach is also referred to as crowdsourcing. Alternatively or in addition, mobile devices may be used for collecting fingerprints in a systematic manner. Collected fingerprint data may be uploaded to a database in a server or in the cloud, where algorithms may be run to generate radio coverage area models of Bluetooth beacons and/or radio maps for positioning purposes.

In the positioning stage, a mobile device may estimate its current location based on own measurements taken from the radio interface and on the data or a subset of data that is available from the training stage. Coverage area model data or radio map data that has been generated in the training stage may be transferred to mobile devices by a server via the Internet as assistance data for use in position determinations. Alternatively, coverage area model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

According to an exemplary aspect of the invention, a method performed by an apparatus is disclosed, wherein the method comprises:

receiving one or more observation reports, wherein each of the observation reports is associated with a respective radio positioning support device of a plurality of radio positioning support devices of a radio positioning support system, and wherein each of the observation reports contains an indication for a number of radio positioning support devices of the plurality of radio positioning support devices from which a radio positioning support signal is observable at the position of the respective radio positioning support device with which the respective observation report is associated and/or an indication for each radio positioning support device of the plurality of radio positioning support devices from which a radio positioning support signal is observable at a position of the respective radio positioning support device with which the respective observation report is associated;

determining, based on the observation reports, whether a predetermined radio positioning support criterion is met by the radio positioning support system; and if it is determined that the predetermined radio positioning support criterion is not met by the radio positioning support system, at least partially reconfiguring and/or causing at least partially reconfiguring the radio positioning support system.

The apparatus may be any one embodiment of the below disclosed apparatus(es).

The radio positioning support system may be any one embodiment of the below disclosed system.

The radio positioning support system may be a positioning system for a predetermined environment (e.g. for a building or a complex of buildings like a shopping center, a parking garage, an airport, a company site, etc.). For example, the radio positioning support system may be an indoor positioning system or a self-contained positioning system or a combination thereof, for example a self-contained indoor positioning system.

One or more (e.g. all) radio positioning support devices of the plurality of radio positioning support devices may transmit (e.g. broadcast) or trigger to transmit or may be configured to transmit or to trigger to transmit a respective radio positioning support signal. For example, one or more (e.g. all) radio positioning support devices of the plurality of radio positioning support devices may transmit (e.g. broadcast) or trigger to transmit or may be configured to transmit or to trigger to transmit (a) respective radio positioning support signal(s) automatically and/or repeatedly, for example on a periodic basis. The respective radio positioning support signal(s) may contain positioning support data. The positioning support data are for example configured to enable one or more mobile devices receiving the respective radio positioning support signal(s) to estimate their position at least partially based on these positioning support data. An example of such positioning support data is an identifier of the radio positioning support device of the plurality of radio positioning support devices by which the respective radio positioning support signal is transmitted (e.g. broadcasted) or triggered to be transmitted. By receiving one or more of the radio positioning support signals and/or by evaluating (e.g. measuring) one or more of the radio positioning support signals, a mobile device may accordingly estimate its position as disclosed above (e.g. by additionally using data representing a coverage area model or a radio map that has been generated in a training stage of the radio positioning support system as disclosed above).

A radio positioning support signal may be understood to be observable at a position of a radio positioning support device if the radio positioning support signal is receivable with a minimum quality (e.g. a minimum signal-to-noise ratio and/or a minimum signal power) at the position of the radio positioning support device.

One or more (e.g. all) radio positioning support devices of the plurality of radio positioning support devices may scan or may be configured to scan for radio positioning support signals transmitted (e.g. broadcasted) or triggered to be transmitted by other radio positioning support devices. For example, all radio positioning support signals that are received with a minimum quality by a radio positioning support device when scanning for radio positioning support signals may be understood to be observable at the position of this radio positioning support device. The scanning may be performed repeatedly and/or for a predetermined period of time.

Optionally, the one or more (e.g. all) radio positioning support devices of the plurality of radio positioning support devices may determine or may be configured to determine, when or after scanning for radio positioning support signals, an identifier for each radio positioning support device of the plurality of radio positioning support devices from which a radio positioning support signal is observable at the position of the radio positioning support device (e.g. such (an) identifier(s) may be extracted from (a) received radio position support signal(s)). Alternatively or additionally, the one or more (e.g. all) radio positioning support devices of the plurality of radio positioning support devices may determine or may be configured to determine, when or after scanning for radio positioning support signals, the number of radio positioning support devices of the plurality of radio positioning support devices from which a radio positioning support signal is observable at the position of the radio positioning support device and/or whether this number is less than and/or equal to and/or greater than a threshold (e.g. a predetermined number of different radio positioning support signals).

An observation report may be understood to be associated with a radio positioning support device of the plurality of radio positioning support devices if the observation report has been generated and/or (e.g. initially) transmitted and/or triggered to be (e.g. initially) transmitted by the radio positioning support device.

For example, a radio positioning support device (e.g. each radio positioning support device) of the plurality of radio positioning support devices may generate or may be configured to generate an observation report containing an indication for a number of radio positioning support devices of the plurality of radio positioning support devices from which a radio positioning support signal is observable at the position of the respective radio positioning support device (e.g. after scanning for radio positioning support signals) and/or an indication for each radio positioning support device of the plurality of radio positioning support devices from which a radio positioning support signal is observable at the position of the respective radio positioning support device (e.g. after scanning for radio positioning support signals). For example, the observation report(s) may be generated (e.g. always) after scanning for radio positioning support signals.

Alternatively, the observation report(s) may (only) be generated if a particular result is obtained from the scanning for radio positioning support signals (e.g. if it is determined that the number of radio positioning support devices of the plurality of radio positioning support devices from which a radio positioning support signal is observable is less than and/or equal to and/or greater than a threshold (e.g. a predetermined number of different radio positioning support signals). The particular result may be selected such that it is at least likely that the predetermined positioning criterion is not met. This allows a decentralized and simple solution for reconfiguring the radio positioning support system, because the observation reports may only be generated (and subsequently transmitted) if it is at least likely that the predetermined positioning criterion is not met.

Subsequently, the generated observation report(s) may be transmitted (e.g. broadcasted) or triggered to be transmitted as part of the radio positioning support signal by the respective radio positioning support device. Alternatively or additionally, the generated observation report(s) may be transmitted or triggered to be transmitted separate from the radio positioning support signal by the respective radio positioning support device.

Furthermore, one or more (e.g. all) radio positioning support devices of the plurality of radio positioning support may retransmit or may be configured to retransmit (e.g. forward) observation reports which they receive from other radio positioning support devices of the plurality of radio positioning. For example, the radio positioning support devices of the plurality of radio positioning may form a mesh network for distributing the one or more observation reports. This is for example advantageous to enable receiving the one or more observation reports if the apparatus performing the disclosed method is within the radio coverage of only a subgroup (e.g. one) of the radio positioning support devices associated with the one or more observation reports.

It is to be understood that the one or more observation reports may contain further information in addition to an indication for each radio positioning support device of the plurality of radio positioning support devices from which a radio positioning support signal is observable at the position of the respective radio positioning support device.

Furthermore, it is to be understood that it is not necessary that all radio positioning support devices of the plurality of radio positioning support devices scan and/or are configured to scan for radio positioning support signals and/or transmit and/or are configured to transmit observation reports. This is for example advantageous for updating existing radio positioning systems which comprise radio positioning support devices which are not able to scan for radio positioning support signals.

An example of an indication for a number of radio positioning support devices of the plurality of radio positioning support devices contained in a observation report may be a quantitative indication, for example representing a number of radio positioning support devices of the plurality of radio positioning support devices from which radio positioning support signals are observable at a position of a radio positioning support device (e.g. a number determined when or after scanning for radio positioning support signals). Alternatively, an indication for a number of radio positioning support devices of the plurality of radio positioning support devices contained in an observation report may be a qualitative indication (e.g. a qualitative indication obtained as and/or representing a result of a determining performed when or after scanning for radio positioning support signals), for example indicating whether a number of radio positioning support devices of the plurality of radio positioning support devices from which radio positioning support signals are observable at a position of a radio positioning support device is less than and/or equal to and/or greater than a threshold (e.g. a predetermined number of different radio positioning support signals).

An example of an indication for a radio positioning support device of the plurality of radio positioning support devices may be an identifier of the radio positioning support device (e.g. an identifier determined when or after scanning for radio positioning support signals).

Receiving the one or more observation reports may be understood to mean that the one or more observation reports are received by a communication interface (e.g. a radio interface and/or a network interface) of the apparatus. For example, the one or more observation reports are received in a signal (e.g. a communication signal like a radio signal) transmitted or triggered to be transmitted by one or more radio positioning support devices of the plurality of radio positioning support devices.

The predetermined radio positioning support criterion may be selected such that the radio positioning support system enables mobile devices to estimate their positions with a predetermined minimum accuracy within a coverage area of the radio positioning support system if the predetermined radio positioning support criterion is met.

For example, the at least partially reconfiguring the radio positioning support system may involve reconfiguring one or more radio positioning support devices of the plurality of radio positioning support devices. Causing at least partially reconfiguring the radio positioning support system may be understood to mean that the at least partially reconfiguring the radio positioning support system is controlled, for example by determining and transmitting control information to one or more radio positioning support devices of the plurality of radio positioning support devices which cause the one or more radio positioning support devices to reconfigure themselves.

In certain exemplary embodiments of the invention, the disclosed method may be used during the positioning stage of the radio positioning support system to adapt the configuration of the radio positioning support system to changes in a radio environment of the radio positioning support system which may for example be due to a change of a position of one or more radio positioning support devices, or a failure of one or more radio positioning support devices, or a (e.g. temporary) presence of interference, or a combination thereof. In a first step, the observation reports may be received and, in a subsequent second step, it may be determined, based on the received observation reports, whether a predetermined radio positioning support criterion is met by the radio positioning support system. If the predetermined radio positioning support criterion is not met, this may indicate that the radio environment of the radio positioning support system has changed. Accordingly, the radio positioning support system may be at least partially reconfigured or caused to be at least partially reconfigured in a third step, if it is determined that the predetermined radio positioning support criterion is not met by the radio positioning support system. The at least partially reconfiguring may involve reconfiguring one or more radio positioning support devices of the plurality of radio positioning support devices such that the radio positioning support system meets the predetermined radio positioning support criterion or, if not possible, comes as close as possible to the predetermined radio positioning support criterion. For example, one or more iterations of these steps may be necessary before the radio positioning support criterion is met.

This is for example advantageous to allow reconfiguring the radio positioning support system such that it meets the predetermined radio positioning support criterion or, if not possible, to come as close as possible to the predetermined radio positioning support criterion.

According to a further exemplary aspect of the invention, an apparatus is disclosed, wherein the apparatus comprises means for performing the steps of any one embodiment of the disclosed method.

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory including computer program code, the at least one memory and the computer program code with the at least one processor configured to cause the apparatus at least to perform any one embodiment of the disclosed method (e.g. the steps of any one embodiment of the disclosed method).

For example, the disclosed apparatus(es) may be modules or components for a device, for example chips. Alternatively, the disclosed apparatus(es) may be devices. In particular, the disclosed apparatus(es) may be a server or a hub for the radio positioning support system.

It is to be understood that the disclosed apparatus(es) may comprise only the disclosed components (e.g. means) or may further comprise one or more additional components (e.g. means). Examples of such additional components are a communication interface, a network interface, a radio interface (e.g. a receiver, a transmitter and/or a transceiver), a data interface, a user interface (e.g. a touch-sensitive display, a keyboard, a touchpad, a display, etc.) etc.

According to a further exemplary aspect of the invention, a system is disclosed which comprises a plurality of radio positioning support devices and an apparatus according to any one embodiment of the disclosed apparatus(es).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor causing an apparatus to perform any one embodiment of the disclosed method (e.g. the steps of any one embodiment of the disclosed method).

The disclosed method, apparatus(es), system, non-transitory computer readable storage medium and computer program code may be for at least partially reconfiguring the radio positioning support system or at least a partial reconfiguration of the radio positioning support system.

In the following, further features and embodiments of these exemplary aspects of the invention will be described.

According to an exemplary embodiment of the invention, one or more (e.g. all) radio positioning support devices of the plurality of radio positioning support devices is one of:
 a Bluetooth beacon;
 a Bluetooth beacon enabling Bluetooth low energy (BLE) mode; and
 a Bluetooth low energy (BLE) beacon.

The beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals. Additionally, the Bluetooth and/or BLE radio interface may be configured to receive (e.g. detect) Bluetooth and/or BLE radio signals that are for example broadcast by other Bluetooth and/or BLE beacons. Accordingly, the radio positioning support signal transmitted by such a beacon may be a Bluetooth and/or BLE radio signal (e.g. a periodically transmitted Bluetooth and/or BLE advertisement signal containing and/or representing an advertising data).

Such beacons can be easily installed at various installation positions and require little to no maintenance. For example, a plurality of beacons may be easily distributed across a certain area and may cover a certain area (e.g. the coverage area of the radio positioning support system) with radio signals transmitted (e.g. broadcasted) by the beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that the many mobile devices may use the radio positioning support system without any adaptation of hardware. As a result, the approach may be globally scalable and have low maintenance and deployment costs. In addition, regarding positioning utilizing received signal strength (RSS) the end-user experience may be acceptable with these technologies, since a horizontal positioning accuracy of 2 to 3 meters as well as a high reliability in floor detection may be achieved. The beacons may be stand-alone devices or be integrated into or attached to some other device. For instance, a radio positioning support device may be a Bluetooth tag or token or a part thereof comprising such a beacon. Bluetooth beacons, in particular in low energy mode, require comparably little energy and the use of Bluetooth low energy may enable a positioning with limited energy consumption at all involved devices.

As mentioned above, many mobile devices already comprise Bluetooth receivers and/or BLE receivers. Thus, each of the above embodiments may have the effect that positioning solutions based on such beacons can be employed without any further hardware updates on the mobile device side. As an example, the mobile device may comprise a Bluetooth and/or BLE radio interface which includes at least a Bluetooth and/or BLE receiver. The Bluetooth and/or BLE receiver may also be a part of a Bluetooth and/or BLE transceiver. The Bluetooth and/or BLE radio interface may be configured to detect radio signals that are broadcast by Bluetooth and/or BLE beacons.

A Bluetooth beacon that is employed for the invention may be any kind of Bluetooth beacon complying with any present or future standard. The Bluetooth standards are specified by the Bluetooth Special Interest Group and are presently available under https://www.bluetooth.com/.

It is to be understood, however, that other types of radio positioning support devices than variations of Bluetooth beacons may be used as well, for instance tags or other devices that are configured to transmit ultra-wideband (UWB) signals or any wireless radio signals that might emerge in the future. For example, one or more radio positioning support devices of the plurality of radio positioning support devices may be an access point and/or a router of a wireless local area network (WLAN). Such an access point and/or router of a WLAN may comprise a WLAN radio interface, which for example includes a WLAN transceiver. The WLAN radio interface may be configured to transmit and/or receive (e.g. detect) WLAN radio signals. Accordingly, the radio positioning support signal transmitted by such an access point and/or router of a WLAN may be a WLAN radio signal (e.g. a periodically transmitted beacon signal containing and/or representing a service set identifier (SSID) of the WLAN of the access point and/or router). WLAN is for example specified by the standards of the IEEE 802.11 family (http://www.ieee.org/).

According to an exemplary embodiment of the invention, each radio positioning support device of the plurality of radio positioning support devices is installed at an (e.g. fixed) installation position.

The installation position of a radio positioning support device may be understood to be the position at which the radio positioning support device is operated (e.g. transmits radio positioning support signal). A radio positioning support device may be understood to be installed at a fixed installation position if (or as long as) the position at which the radio positioning support device is operated (e.g. transmits radio positioning support signal) does not change.

According to an exemplary embodiment of the invention, each of the one or more observation reports may contain and/or represent at least one of:
 an identifier of the respective radio positioning support device with which the observation report is associated;
 an indication of the transmission power of the respective radio positioning support device with which the observation report is associated;
 an indication of the installation position of the radio positioning support device with which the observation report is associated;
 an identifier of each radio positioning support device from which a radio positioning support signal is observable at the (e.g. installation) position of the respective radio positioning support device with which the respective observation report is associated;

an indication of the received signal strength (RSS) for each radio positioning support signal which is observable at the (e.g. installation) position of the respective radio positioning support device with which the respective observation report is associated;

an indication for a number of radio positioning support devices from which a radio positioning support signal is observable at the (e.g. installation) position of the respective radio positioning support device with which the respective observation report is associated.

An example for an identifier of a radio positioning support device is a name of the radio positioning support device, an address of the radio positioning support device (e.g. a MAC address or an IP address), an universally unique identifier (UUID), a service set identifier (SSID), a basic service set identifier (BSSID), or a combination thereof. For example, an identifier of a radio positioning support device of the plurality of radio positioning support devices may be unique or at least unique for the radio positioning support system.

An indication of the installation position of a radio positioning support device may represent the installation position of the radio positioning support device, for example in the form of absolute or relative position coordinates.

An indication of a transmission power of a radio positioning support device may be understood to represent the transmission power with which radio signals (e.g. radio positioning support signals) are transmitted by the radio positioning support device. An example, of an indication of the transmission power is a transmitter signal strength indicator (TSSI) or a physical transmission power level value (e.g. a Tx power level value) in dBm.

An indication of a received signal strength for a radio positioning support signal may represent the power of a received radio positioning support signal (e.g. at the radio positioning support device receiving the radio positioning support signal). An example of an indication of a received signal strength parameter is a received signal strength indicator (RSSI) or a representation of a physical receiving power level value (e.g. a Rx power level value) in dBm.

An indication of a transmission power of a radio positioning support device and an indication of received signal strength for a radio positioning support signal may be also referred to as radio transmission parameters.

An indication for a number of radio positioning support devices from which a radio positioning support signal is observable at the (e.g. installation) position of the respective radio positioning support device with which the respective observation report is associated may be a quantitative indication or a qualitative indication as disclosed above.

According to an exemplary embodiment of the invention, the method comprises:

determining, at least partially based on the observation reports, whether at any position (e.g. every position) within a coverage area of the radio positioning support system at least a predetermined number of different radio positioning support signals is (e.g. expected to be) observable, and/or determining, at least partially based on the observation reports, whether at one or more positions (e.g. the installation positions of the radio positioning support device of the plurality of radio positioning support devices) within a coverage area of the radio positioning support system less than a predetermined number of different radio positioning support signals is (e.g. expected to be) observable.

The coverage area of the radio positioning support system may be understood to represent an area of a predetermined environment within which the radio positioning support system is expected to support mobile devices to estimate their positions. Alternatively or additionally, the coverage area of the radio positioning support system may be defined by an environment and/or an area within which the radio positioning support system is capable to support mobile devices to estimate their positions.

The different radio positioning support signals may be understood to relate to radio positioning support signals transmitted or triggered to be transmitted by different radio positioning support devices of the plurality of radio positioning support devices. In other words, each of the different radio positioning support signals may be transmitted or triggered to be transmitted by another radio positioning support device of the plurality of radio positioning support devices.

The predetermined number of different radio positioning support signals may be selected such that a mobile device is enabled to estimate its position with a predetermined accuracy when it observes (e.g. receives with a minimum quality) this number of different radio positioning support signals at the respective position. For example, the predetermined number of different radio positioning support signals may be set to three, four, five, or ten to name a few examples.

For example, at least three radio positioning support signals may be necessary for estimating a position by use of a trilateration algorithm. Furthermore, three radio positioning support signals may be typically necessary to enable estimating a position by use of a positioning algorithm based on fingerprints with an acceptable accuracy. The accuracy may be increased by increasing the predetermined number of different radio positioning support signals, for example the predetermined number of different radio of different radio positioning support signals may be set to five or ten for a better accuracy, to name a few examples.

For example, the plurality of radio positioning support devices are installed at different installation positions across the coverage area of the radio positioning support system during the installation phase such that at any position within the coverage area of the radio positioning support system at least the predetermined number of different radio positioning support signals is observable. However, this initial radio environment of the radio positioning support system may change for example due to a change of an installation position of one or more radio positioning support devices, or a failure of one or more radio positioning support devices, or a (e.g. temporary) presence of interference, or a combination thereof. For example, the presence of a crowd of people in the vicinity of a radio positioning support device may attenuate radio signals transmitted or triggered to be transmitted by the radio positioning support device and, thus, affects the radio coverage of the radio positioning support device (e.g. significantly reduce radio coverage). Such changes of the radio environment of the radio positioning support system may be detected by determining whether at any position within the coverage area of the radio positioning support system at least the predetermined number of different radio positioning support signals is observable.

As disclosed above, the determining whether at any position within the coverage area of the radio positioning support system at least the predetermined number of different radio positioning support signals is (e.g. expected to be) observable is based on the observation reports. Additionally, this determining may be based on further information (e.g. one or more further observation reports that have been received before and/or a previously determined radio coverage model of the radio positioning support system).

For example, the predetermined radio positioning support criterion may be understood to be met if it is determined that at any position within the coverage area of the radio positioning support system at least the predetermined number of different radio positioning support signals is (e.g. expected to be) observable.

Alternatively or additionally, the predetermined radio positioning support criterion may be understood to be not met if it is determined that there are one or more positions within the coverage area of the radio positioning support system at which less than a predetermined number of different radio positioning support signals is (e.g. expected to be) observable. The one or more positions may be predetermined positions, for example the one or more positions may correspond to one or more predetermined installation positions of one or more (e.g. all) radio positioning support devices of the plurality of radio positioning support devices. This may be particularly suited for embodiments according to which the observation reports contain indications for the number of radio positioning support devices of the plurality of radio positioning support devices from which a radio positioning support signal is observable at a position of a radio positioning support device (e.g. qualitative or quantitative indications as disclosed above). For example, if one or more of the observation reports contain a qualitative indication indicating that a number of radio positioning support devices from which a radio positioning support signal is observable at the (e.g. installation) position of the positioning support devices with which these observation reports are associated is less than the predetermined number of different radio positioning support signals, it may be determined that the predetermined radio positioning support criterion is not met.

If it is determined that the predetermined radio positioning support criterion is not met by the radio positioning support system, one or more specific positions and/or one or more specific area within the coverage area of the radio positioning support system may be obtained as a result of the determined, for example, it may be determined that at the specific positions and/or within the specific areas less radio positioning support signals than the predetermined number of different radio positioning support signals are (e.g. expected to be) observable.

According to an exemplary embodiment of the invention, the method comprises:

determining, at least partially based on the observation reports, a coverage area model of the radio positioning support system.

Determining, at least partially based on the observation reports, a coverage area model of the radio positioning support system may be understood to mean that information contained in the observation reports are at least partially used for determining the coverage area model of the radio positioning support system. Exemplary information suited for determining the coverage area model of the radio positioning support system are indications for each radio positioning support device of the plurality of radio positioning support devices from which a radio positioning support signal is observable at a position of a respective radio positioning support device and/or radio transmission parameters associated with radio positioning support devices of the plurality of radio positioning support devices. Accordingly, this may be particularly suited for embodiments according to which the observation reports contain indications for each radio positioning support device of the plurality of radio positioning support devices from which a radio positioning support signal is observable at a position of a respective radio positioning support device and, optionally, radio transmission parameters associated with radio positioning support devices of the plurality of radio positioning support devices.

As disclosed above, the coverage area of the radio positioning support system may be understood to represent an area of a predetermined environment within which the radio positioning support system is expected to support mobile devices to estimate their positions. Alternatively or additionally, the coverage area of the radio positioning support system may be defined by an environment and/or an area within which the radio positioning support system is capable to support mobile devices to estimate their positions.

A coverage area model of the radio positioning support system may be understood to be a representation of the (e.g. expected) coverage area of the radio positioning support system. An example of a coverage area model of the radio positioning support system may be a radio map of the radio positioning support system representing the (e.g. fixed) installation positions of the radio positioning support devices of the plurality of radio positioning support devices and (e.g. expected) radio coverages associated with the radio positioning support devices of the plurality of radio positioning support devices.

The (e.g. expected) radio coverage associated with a radio positioning support device may describe (e.g. define) the area within which a radio signal (e.g. a radio positioning support signal) transmitted or triggered to be transmitted by the radio positioning support devices is (e.g. expected to be) observable (e.g. receivable with a minimum quality).

For example, the coverage area model of the radio positioning support system may contain or represent a respective radio coverage model for each radio positioning support device of the plurality of radio positioning support devices. Therein, a radio coverage model for a radio positioning support device may be understood to represent the expected radio coverage associated with this radio positioning support device.

Based on the coverage area model of the radio positioning support system, it may be determined whether the predetermined radio positioning support criterion is met. For example, the predetermined radio positioning support criterion may be understood to be met if it is determined, based on the coverage area model of the radio positioning support system, that at any position within the coverage area of the radio positioning support system at least a predetermined number of different radio positioning support signals is expected to be observable.

Determining a coverage area model of the radio positioning support system may involve determining, for one or more (e.g. all) radio positioning support devices of the plurality of radio positioning support devices, a respective radio coverage model at least partially based on the observation reports. Additionally, this determining may be based on further information (e.g. one or more further observation reports that have been received before and/or a previously determined coverage area model of the radio positioning support system). For example, a previously determined coverage area model of the radio positioning support system may be updated by determining, for one or more (e.g. all) radio positioning support devices of the plurality of radio positioning support devices, a respective radio coverage model at least partially based on the observation reports.

After determining the coverage area model of the radio positioning support system, information and/or data representing the determined (e.g. updated) coverage area model of the radio positioning support system may be provided for use by one or more mobile devices to estimate their position at least partially based on this overage area model of the radio positioning support system (e.g. the information and/or data representing the determined (e.g. updated) coverage area model of the radio positioning support system may be communicated to the one or more mobile devices and/or to a positioning server from which they are retrievable by the one or more mobile devices).

A radio coverage model may represent an estimate of a two-dimensional or a three-dimensional coverage map. It may describe (e.g. define) the expected radio coverage (e.g. an expected coverage area) of a radio positioning support device within which a radio positioning support signal transmitted or triggered to be transmitted by the radio positioning support device (e.g. installed at an installation position) is expected to be observable. The real radio coverage of the radio positioning support device may however deviate from such an expected radio coverage. As disclosed above, a radio positioning support signal may be understood to be observable at a specific position and/or in a specific area if the radio positioning support signal is receivable with a minimum quality (e.g. a minimum signal-to-noise ratio and/or a minimum signal power) at this specific position and/or within this specific area.

A radio coverage model may be a hard-boundary model or a soft-boundary model (e.g. a hard-boundary model or a soft-boundary model describing an expected radio coverage).

An example for a soft-boundary radio coverage model may be a parametric radio model. Data of such a parametric radio model may be considered to be data which enable determination of one or more characteristics of one or more radio signals (e.g. radio positioning support signals) transmitted or triggered to be transmitted by a radio positioning support device that are expected to be observable at different positions. For example, data of such a parametric radio model may represent radio transmission parameters of the parametric radio model. Using radio transmission parameters of the parametric radio model may have the effect that the required amount of data for defining the one or more characteristics of one or more radio signals may be particularly small. An example of a parametric radio model is a path loss model for radio signals (e.g. radio positioning support signals) transmitted or triggered to be transmitted by a radio positioning support device. In this case, the radio transmission parameters may comprise a path loss exponent and an indication of a transmission power used by the transmitter of the radio positioning support device. Based on data of a parametric radio model an expected radio coverage of a radio positioning support device installed at a (potential) installation position may be determined.

Radio transmission parameters of a parametric radio model of a radio positioning support device may be at least partially determined (e.g. derived or selected or calculated) at least partially based on the one or more observation reports. For example, the radio transmission parameters of a parametric radio model of a radio positioning support device may at least partially correspond to and/or determined based on one or more radio transmission parameters associated with this radio positioning support device, wherein the one or more radio transmission parameters associated with this radio positioning support device may for example be represented by and/or contained in the one or more observation reports (e.g. one or more observation reports associated with the radio positioning support device and/or an (e.g. adjacent) radio positioning support device).

In case different values are determined for a radio transmission parameter based on one or more radio transmission parameters represented by and/or contained in the one or more observation reports, a mean value (e.g. an arithmetic mean value or a median mean value) may for example be used as value for this radio transmission parameter. Alternatively, one value of the different values may be selected according to a predetermined rule to be used for as value for this radio transmission parameter (e.g. the lowest or highest value may be used as value for this radio transmission parameter).

As disclosed above, an indication of a transmission power of a radio positioning support device and an indication of received signal strength for a radio positioning support signal may be referred to as radio transmission parameters. A radio transmission parameter may be understood to be associated with a radio positioning support device if the radio transmission parameter describes a feature (e.g. a physical quantity) of a radio signal transmitted or triggered to be transmitted by this radio positioning support device, for example if the radio transmission parameter indicates a transmission power of this radio positioning support device and/or if the radio transmission parameter indicates a received signal strength for a radio positioning support signal transmitted or triggered to be transmitted by this radio positioning support device.

If the installation positions of the radio positioning support devices of the plurality of radio positioning support devices and, thus, also the distances between the radio positioning support devices are known, such radio transmission parameters associated with a radio positioning support device may for example be used to determine (e.g. calculate) further radio transmission parameters for a parametric radio model like a path loss exponent.

An example for a hard-boundary radio coverage model may be a geometric model. Data of such a geometric radio model may be considered to be data which (e.g. geometrically) describe (e.g. define) an expected radio coverage of a radio positioning support device (e.g. installed at an installation position).

For example, each of the respective radio coverage models is one of:
a polygon;
a rectangle and/or a square;
a cuboid and/or a cube;
an ellipse and/or a circle; and
an ellipsoid and/or a sphere.

If the radio coverage model is one of these geometric shapes it may be referred to as a geometric model of an expected radio coverage of a radio positioning support device. Using such geometric models has the effect that the radio coverage model is very simple, only requires a small amount of data and is easy to analyze.

The installation position of a radio positioning support device may be within the geometric model, for example it may be at the center of the geometric model. The perimeter and/or the circumferences and/or the surface of the geometric model may for example describe (e.g. define) a boundary of an expected radio coverage (e.g. an area and/or a spatial dimension) of the radio positioning support device within which radio signals (e.g. radio positioning support signals) transmitted or triggered to be transmitted by the radio positioning support device are expected to be observable (e.g. receivable with a minimum quality such as a minimum signal-to-noise ratio and/or a minimum signal power). Outside of the perimeter and/or the circumferences and/or the surface, radio signals transmitted or triggered to be transmitted by the radio positioning support device are for example expected to be not observable (e.g. only receivable with a quality less than a minimum quality such as a minimum signal-to-noise ratio and/or a minimum signal power).

A parameter of a geometric model of a radio coverage of a radio positioning support device may be at least partially determined (e.g. selected or calculated) at least partially based on the one or more observation reports. Examples of such parameters are a diameter, a radius and/or an edge length of the geometric model. For example, the parameter of the geometric model may be selected from a list of parameters according to a predetermined mapping with one or more radio transmission parameters associated with the radio positioning support device. For example, an edge length of 16 m is selected for a square as geometric model of an (e.g. expected) radio coverage of a radio positioning support device having a transmission power of 0 dBm and a path loss exponent of 4.

According to an exemplary embodiment of the invention, the at least partially reconfiguring the radio positioning support system comprises:
    adapting a transmission parameter of one or more radio positioning support devices of the plurality of radio positioning support devices.

An example of such a transmission parameter is a transmission power, a modulation scheme or a channel code.

By adapting such a transmission parameter, it may be possible to extend the radio coverage of the radio positioning support device (e.g. the area within which a radio signal (e.g. a radio positioning support signal) transmitted or triggered to be transmitted by the radio positioning support devices is observable). For example, the radio coverage of the radio positioning support device may be extended by increasing the transmission power of a radio positioning support devices if the path loss exponent remains constant.

The one or more radio positioning support devices of the plurality of radio positioning support devices may for example be part of or form a Personal Area Network (PAN, e.g. a PAN as specified in IEEE 802.15.4-2011 which is available from http://www.ieee.org/) and/or a group (e.g. a cluster) of radio positioning support devices. The plurality of radio positioning support devices may comprise more than one PAN and/or more than one group of radio positioning support devices.

Any radio positioning support device of a PAN and/or a group may be nominated as PAN and/or group coordinator which is responsible for coordinating the PAN and/or the group, for example by controlling the transmission parameters of the radio positioning support devices of the PAN and/or the group. In particular, the PAN and/or group coordinator may adapt and/or cause adapting and/or may be configured to adapt and/or may be configured to cause adapting the transmission parameters of the radio positioning support devices of the PAN and/or the group. For example, all radio positioning support devices of a PAN and/or a group may use the same transmission parameters. This for example allows a decentralized control of the radio positioning support devices.

Alternatively or additionally, the one or more radio positioning support devices of the plurality of radio positioning support devices may for example be specific radio positioning support devices of the plurality of radio positioning support devices which are for example controlled by a server or a hub of the radio positioning support device. This for example allows a centralized control of the radio positioning support devices.

This embodiment may for example be advantageous, if it is determined that at a specific position or in a specific area within the coverage area of the radio positioning support system less than a predetermined number of different radio positioning support signals is observable, to extend the radio coverage of one or more adjacent radio positioning support devices (e.g. to increase the number of different radio positioning support signals observable at this specific position or in this specific area).

According to an exemplary embodiment of the invention, the method comprises:
    if a transmission parameter of one or more radio positioning support devices of the plurality of radio positioning support devices is adapted and/or if it is determined based on the observation reports that a quality (e.g. an accuracy) of a previously determined coverage area model of the radio positioning support system is less than a predetermined quality (e.g. lower than a predetermined accuracy, e.g. lower than 1 m), newly determining (e.g. updating) and/or triggering newly determining (e.g. updating) the coverage area model of the radio positioning support system (e.g. by accordingly adapting a parametric radio model of the one or more radio positioning support devices and/or by collecting learning data like fingerprint observation reports as disclosed above with respect to the learning stage).

After newly determining (e.g. updating) the coverage area model of the radio positioning support system, information and/or data representing the determined (e.g. updated) coverage area model of the radio positioning support system may be provided for use by one or more mobile devices to estimate their position at least partially based on this overage area model of the radio positioning support system (e.g. the information and/or data representing the determined (e.g. updated) coverage area model of the radio positioning support system may be communicated to the one or more mobile devices and/or to a positioning server from which they are retrievable by the one or more mobile devices).

According to an exemplary embodiment of the invention, the at least partially reconfiguring the radio positioning support system comprises:
    determining a potential installation position and/or a potential installation area for installing an additional radio positioning support device.

This embodiment may for example be advantageous, if it is determined that at a specific position or in a specific area within the coverage area of the radio positioning support system less than a predetermined number of different radio positioning support signals is observable and if it is not possible to extend the radio coverage of an adjacent radio position support device to this specific position or to this specific area. The potential installation position and/or the potential installation area for installing an additional radio positioning support device may for example represent such a specific position and/or such a specific area.

According to an exemplary embodiment of the invention, the apparatus (e.g. the disclosed apparatus(es)) is or is part of a radio positioning support device of the plurality of radio positioning support devices or a server (e.g. a positioning server) of the radio positioning support system or a hub of the radio positioning support system. For example, the apparatus may be or may be part of a radio positioning support device of the plurality of radio positioning support devices that is nominated as a PAN and/or group coordinator as disclosed above.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1A:
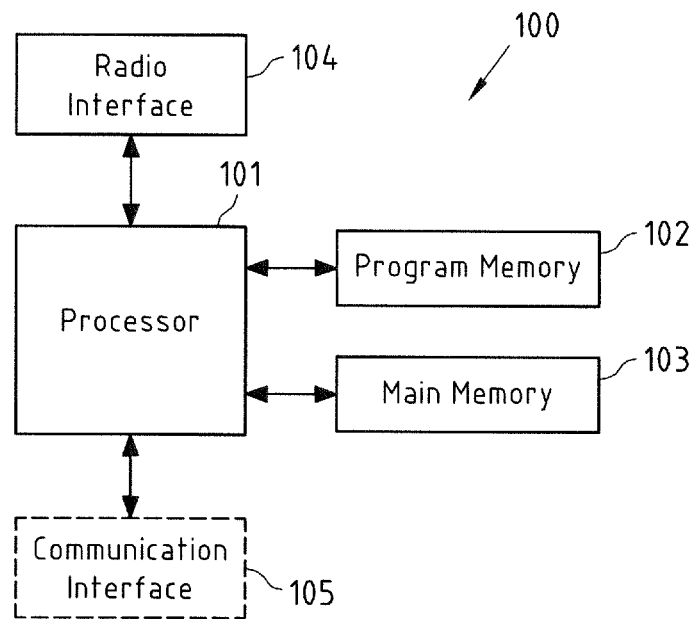
FIG. 1a is a block diagram of an exemplary embodiment of an apparatus according to the invention.

FIG. 1a is a block diagram of an exemplary embodiment of an apparatus according to the invention. In the following, it is assumed that the apparatus is a server 100 for a radio positioning support system.

Server 100 comprises a processor 101. Processor 101 may represent a single processor or two or more processors, which are for instance at least partially coupled, for instance via a bus. Processor 101 executes a program code stored in program memory 102 (for instance program code causing server 100 to perform one or more of the embodiments of a method (or parts thereof) according to the invention (as for instance further described below with reference to FIG. 2), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a first memory portion that is fixedly installed in server 100, and a second memory portion that is removable from server 100, for instance in the form of a removable SD memory card.

Main memory 103 may for instance be a volatile memory. It may for instance be a DRAM memory, to give non-limiting example. It may for instance be used as a working memory for processor 101 when executing an operating system and/or programs.

Processor 101 further controls a radio interface 104 configured to receive and/or output data and/or information. For instance, radio interface 104 may be configured to receive radio signals from a beacon (e.g. beacon 200 as described below with respect to FIG. 1b). For this, the radio interface 104 may at least comprise a BLE radio interface including at least a BLE receiver (RX). It is to be understood that the BLE receiver may also be a part of a BLE transceiver. The BLE radio interface is configured to scan for radio signals that are broadcast by BLE beacons such as beacon 200 as described below with respect to FIG. 1b, to extract advertising data contained in detected BLE signals. It is to be understood that any computer program code based processing required for receiving and evaluating BLE signals may be stored in an own memory of the BLE radio interface 104 and executed by an own processor of the BLE radio interface 104 or it may be stored for example in memory 103 and executed for example by processor 101.

Moreover, processor 101 may control a further optional communication interface 105 which is for example configured to allow communication according to a 2G/3G/4G/5G cellular communication system and/or a non-cellular communication system, such as for instance a WLAN network.

The components 102 to 105 of server 100 may for instance be connected with processor 101 by means of one or more serial and/or parallel busses.

It is to be understood that server 100 may comprise various other components. For example, server 100 may optionally comprise a user interface (e.g. a touch-sensitive display, a keyboard, a touchpad, a display, etc.).

Figure 1B:
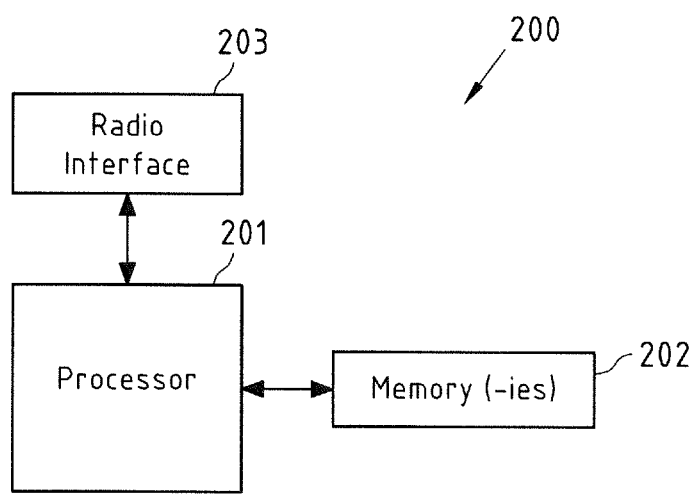
FIG. 1b is a block diagram of an exemplary embodiment of a radio positioning support device according to the invention.

FIG. 1b is a block diagram of an exemplary embodiment of a radio positioning support device according to the invention. In the following, it is assumed that the radio positioning support device is a beacon 200.

Beacon 200 comprises a processor 201. Processor 201 may represent a single processor or two or more processors, which are for instance at least partially coupled, for instance via a bus. Processor 201 executes a program code stored in memory 202 (for instance program code causing beacon 200 to perform one or more of the embodiments of a method (or parts thereof) according to the invention (as for instance further described below with reference to FIG. 5). Some or all of memory 202 may also be included into processor 201. Memory 202 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 201 when executing an operating system and/or programs. Memory 202 may also comprise an operating system for processor 201.

Memory 202 may for instance comprise a first memory portion that is fixedly installed in beacon 200, and a second memory portion that is removable from beacon 200, for instance in the form of a removable SD memory card.

Processor 201 further controls a BLE radio interface 203 configured to receive and/or output data and/or information. For instance, BLE radio interface 203 may at least comprise a BLE radio interface including a BLE transmitter (TX). The BLE radio interface 203 may additionally comprise a BLE receiver (RX). The transmitter and receiver may also be part of a BLE transceiver (TRX). Without limiting the scope of the invention, it is assumed in the following that BLE radio interface 203 is or comprises a BLE transceiver.

The BLE transmitter enables beacon 200 to transmit radio signals in line with any current or future version of the Bluetooth standard supporting a low energy mode. Likewise, the BLE receiver enables beacon 200 to receive radio signals in line with any current or future version of the Bluetooth standard supporting a low energy mode. The BLE receiver is configured to scan for radio signals that are broadcast by BLE beacons such as beacon 200 as described below with respect to FIG. 1b, to extract advertising data contained in received BLE signals. Furthermore, the BLE receiver may be configured to evaluate received radio signals such as determining a received signal strength of a received radio signal. It is to be understood that any computer program code based processing required for receiving and evaluating BLE signals may be stored in an own memory of the BLE radio interface 203 and executed by an own processor of the BLE radio interface 203 or it may be stored for example in memory 202 and executed for example by processor 201.

Accordingly, beacon 200 may be a Bluetooth beacon, a Bluetooth beacon enabling Bluetooth low energy mode, and a Bluetooth low energy beacon.

It is to be understood that beacon 200 may comprise various other components.

Figure 1C:
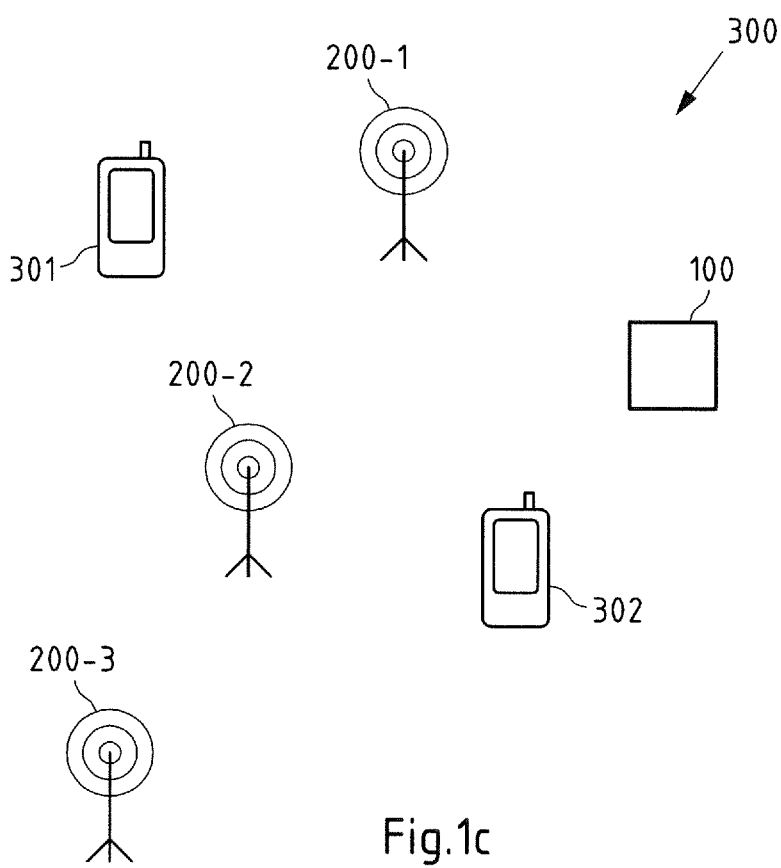
FIG. 1c is a block diagram of an exemplary embodiment of a system according to the invention.

FIG. 1c is a block diagram of an exemplary embodiment of a system 300 according to the invention.

System 300 at least partially illustrates a radio positioning support system of a positioning solution for a predetermined environment such as a building and/or a complex of buildings (e.g. a shopping center, a parking garage, an airport, a company site, etc.). System 300 may for example be in the positioning stage. System 300 comprises beacons 200-1, 200-2 and 200-3 which have been fixedly installed at respective installation positions in the predetermined environment. Beacons 200-to 200-3 may correspond to beacon 200 as described above with respect to FIG. 1b. Optionally, system 300 may comprise further beacons, for example beacons 200-4 to 200-14 (not shown). In the following, reference is made to beacons 200-1 to 200-3 without limiting the scope of the invention.

Furthermore, system 300 comprises server 100 as described above with respect to FIG. 1a. In system 300, server 100 may be configured to receive radio signals from beacons 200-1 to 200-3 (e.g. by radio interface 104) and, optionally, to communicate with mobile devices 301 and 302 (e.g. by optional communication interface 105).

Beacons 200-1 to 200-3 automatically and repeatedly transmit radio positioning support signals containing positioning support data. The positioning support data are for example configured to enable one or more mobile devices such as mobile devices 301 and 302 receiving the radio positioning support signals to estimate their position at least partially based on these positioning support data. For example, beacons 200-1 to 200-3 may be beacons of a plurality of beacons that are installed in the predetermined environment. Adjacent beacons of this plurality of beacons may automatically and repeatedly transmit radio positioning support signals comprising positioning support data. Accordingly, beacons 200-1 to 200-3 may for example be adjacent beacons of such a plurality of beacons. Furthermore, beacons 200-1 to 200-3 may be part of or may form a PAN (e.g. a PAN as specified in IEEE 802.15.4-2011 which is available from http://www.ieee.org/), for example beacon 200-1 is nominated as PAN coordinator. As disclosed above, a PAN coordinator may adapt and/or cause adapting and/or may be configured to adapt and/or may be configured to cause adapting the transmission parameters of the beacons of the PAN. For example, all beacons of a PAN may use the same transmission parameters.

Furthermore, beacons 200-1 to 200-3 scan for radio positioning support signals that are broadcast by other beacons of system 300 and, optionally, evaluate radio positioning support signals detected during such a scan. For example, the detected evaluate radio positioning support signals may be evaluated be measuring the received signal strengths of these signals. After scanning for radio positioning support signals, beacons 200-1 to 200-3 may generate and transmit a respective observation report containing an indication for each beacon of system 300 from which a radio positioning support signal is observable at the position of the respective beacon. For example, if a radio positioning support signal of beacon 200-1 was received by beacon 200-2 when scanning for radio positioning support signals, the observation report subsequently generated and transmitted by beacon 200-2 may contain an indication for beacon 200-1. Alternatively or additionally, beacons 200-1 to 200-3 may generate and transmit a respective observation report containing an indication (e.g. a quantitative or qualitative indication as disclosed above) for a number of beacons of system 300 from which a radio positioning support signal is observable at the position of the respective beacon after scanning for radio positioning support signals. For example, if radio positioning support signals of beacons 200-1 and 200-3 were received by beacon 200-2 when scanning for radio positioning support signals, the observation report subsequently generated and transmitted by beacon 200-2 may contain an quantitative indication indicating that radio positioning support signals from two beacons of system 300 are observable at the installation position of beacon 200-2.

The scanning for radio positioning support signals that are broadcast by other beacons of system 300 and, optionally, evaluating radio positioning support signals detected during such a scan may be performed repeatedly (e.g. on a periodic basis) by beacons 200-1 to 200-3. Accordingly, the observation reports may be also generated and transmitted repeatedly (e.g. on a periodic basis) by beacons 200-1 to 200-3. Alternatively, the observation reports may only be generated and transmitted by beacons 200-1 to 200-3 if a particular result is obtained from the scanning for radio positioning support signals (e.g. if it is determined that the number of beacons of system 300 from which a radio positioning support signal is observable is less than and/or equal to and/or greater than a threshold (e.g. a predetermined number of different radio positioning support signals)).

The observation reports generated by beacons 200-1 to 200-3 may be for example be transmitted as part of the radio positioning support signal transmitted by the respective beacon. Alternatively or additionally, the observation reports may be transmitted or triggered to be transmitted separate from the radio positioning support signals. Furthermore, beacons 200-1 to 200-3 may be configured to retransmit (e.g. forward) observation reports which they receive. For example, server 100 and beacons 200-1 to 200-3 of system 300 may form a mesh network for distributing the observation reports. This is for example advantageous to enable receiving the observation reports associated with beacons 200-1 to 200-3 by server 100 if server 100 is only within the radio coverage of one of beacons 200-1 to 200-3.

It is to be understood that the one or more observation reports may contain further information in addition to an indication for each beacon of system 300 and/or for a number of beacons of system 300 from which a radio positioning support signal is observable at the position of the respective beacon. For example, each of the observation reports may contain and/or represent at least one of the following information:

- an identifier of the beacon with which the observation report is associated (e.g. the beacon by which the observation report is generated and/or transmitted);
- an indication of the transmission power of the beacon with which the observation report is associated;
- an indication of the installation position of the beacon with which the observation report is associated;
- an identifier of each beacon from which a radio positioning support signal is observable at the installation position of the respective beacon with which the respective observation report is associated; and
- an indication of the received signal strength (RSS) for each radio positioning support signal which is observable at the installation position of the respective beacon with which the respective observation report is associated
- an indication for a number of beacons from which a radio positioning support signal is observable at the (e.g. installation) position of the beacon with which the respective observation report is associated.

As disclosed above, an example for an identifier of a beacon is a name, an address (e.g. a MAC address or an IP address), an universally unique identifier (UUID), a service set identifier (SSID), a basic service set identifier (BSSID), or a combination thereof.

An indication of the installation position of a beacon may represent the installation position of the beacon, for example in the form of absolute or relative position coordinates.

An indication of a transmission power of a beacon may be understood to represent the transmission power with which radio signals (e.g. radio positioning support signals) are transmitted by the beacon. An example of an indication of the transmission power is a transmitter signal strength indicator (TSSI) or a physical transmission power level value (e.g. a Tx power level value) in dBm.

An indication of a received signal strength for a beacon may represent the power of a received radio positioning support signal (e.g. at the beacon receiving the radio positioning support signal). An example of an indication of a received signal strength parameter is a received signal strength indicator (RSSI) or a representation of a physical receiving power level value (e.g. a Rx power level value) in dBm.

Therein, an indication of a transmission power of a beacon and an indication of received signal strength for a beacon may be referred to as radio transmission parameters. A radio transmission parameter may for example be understood to be associated with a beacon if the radio transmission parameter indicates a transmission power of the beacon and/or if the radio transmission parameter indicates a received signal strength for a radio positioning support signal transmitted or triggered to be transmitted by the beacon.

An indication for a number of beacons from which a radio positioning support signal is observable at the (e.g. installation) position of the respective beacon with which the respective observation report is associated may be a quantitative indication or a qualitative indication as disclosed above.

Figure 2:
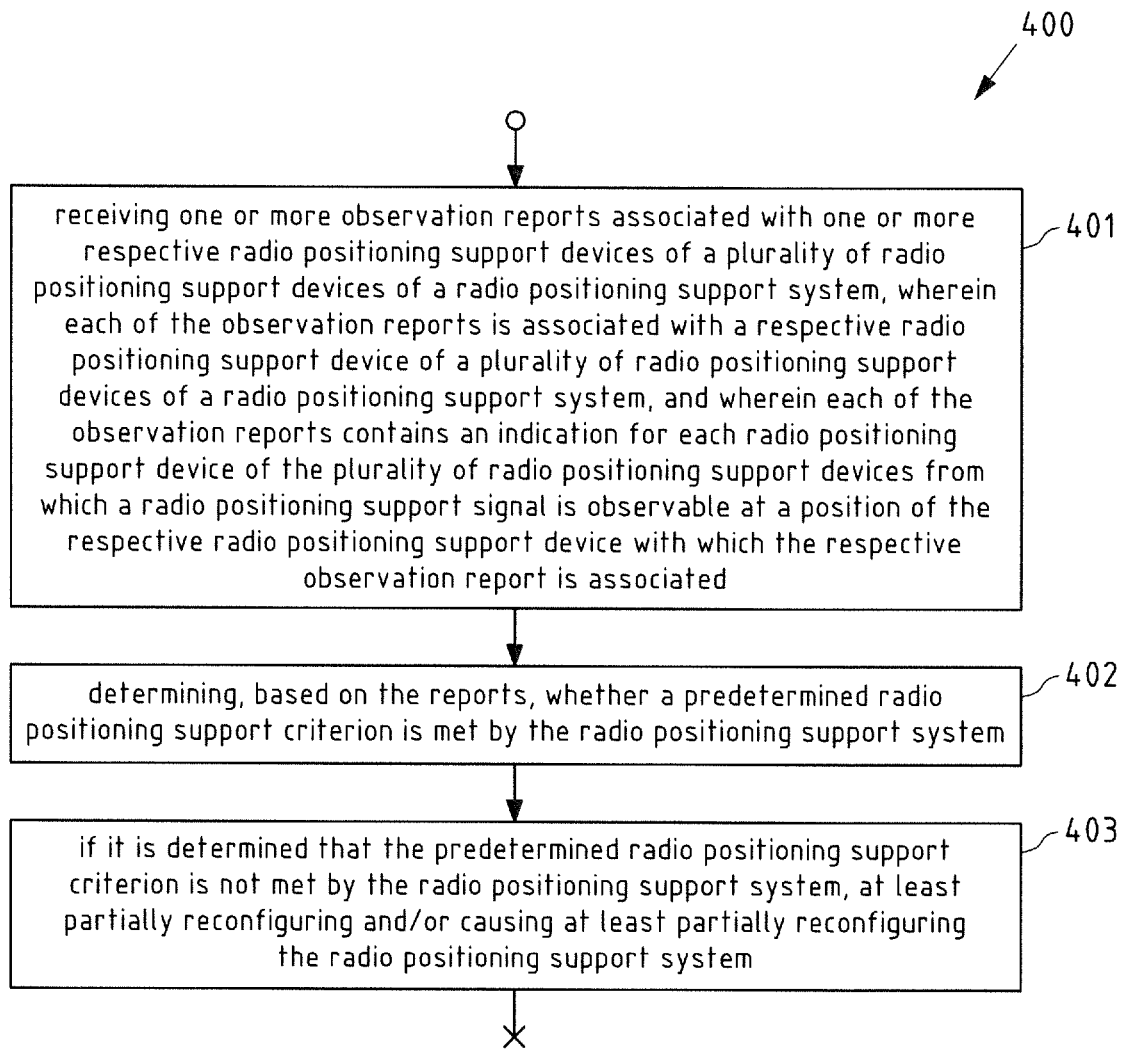
FIG. 2 is a flow chart illustrating an exemplary embodiment of a method according to the invention.

FIG. 2 is a flow chart 400 illustrating an exemplary embodiment of a method according to the invention. Without limiting the scope of the invention, it is assumed in the following that server 100 of system 300 as described above with respect to FIGS. 1*a* and 1*c* performs steps 401 to 403 of flow chart 400.

In step 401, one or more observation reports associated with one or more respective radio positioning support devices of a plurality of radio positioning support devices of system 300 are received by server 100. The radio positioning support devices may for example be beacons 200-1 to 200-3 of system 300, and the one or more observation reports are observation reports generated and transmitted by beacons 200-1 to 200-3, wherein the observation reports contain at least an indication for each beacon of system 300 from which a radio positioning support signal is observable at the position of the respective beacon as described above.

In step 402, server 100 determines, based on the observation reports received in step 401, whether a predetermined radio positioning support criterion is met by system 300.

As disclosed above, the predetermined radio positioning support criterion may be selected such that system 300 enables mobile devices to estimate their positions with a predetermined minimum accuracy within a coverage area of system 300 if the predetermined radio positioning support criterion is met.

For example, the predetermined radio positioning support criterion may require that that at any position within the coverage area of system 300 at least a predetermined number of different radio positioning support signals is expected to be observable. Accordingly, the determining in step 402 may involve determining whether at any position within the coverage area of system 300 at least the predetermined number of different radio positioning support signals is expected to be observable.

To this end, a coverage area model of system 300 may be determined (e.g. updated) in step 402 at least partially based on the observation reports received in step 401. Additionally, this determining may be based on further information (e.g. one or more further observation reports that have been received before step 401 and/or a previously determined coverage area model of the radio positioning support system, e.g. information or data stored in program memory 102 of server 100 representing such further observation reports and/or such a previously determined coverage area model).

A coverage area model of system 300 may be understood to be a representation of the coverage area of system 300. An example of a coverage area model of system 300 may be a radio map of system 300 representing the (e.g. fixed) installation positions of the beacons (e.g. beacons 200-1 to 200-3) of system 300 and expected radio coverages associated with these beacons. For example, the coverage area model of system 300 may contain or represent a respective radio coverage model for each beacon of system 300. Therein, a radio coverage model for a beacon may be understood to represent the expected radio coverage associated with this beacon. Accordingly, determining a coverage area model of system 300 may involve determining, for one or more (e.g.

all) beacons of system 300, a respective radio coverage model at least partially based on the observations report received in step 401.

As disclosed above, a radio coverage model may be a hard-boundary model or a soft-boundary model. An example for a soft-boundary radio coverage model may be a parametric radio model. An example for a hard-boundary radio coverage model may be a geometric model.

Figure 3A:
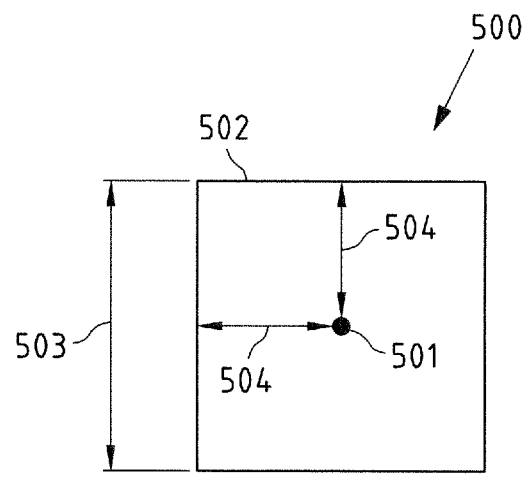
FIGS. 3a-3b show exemplary radio coverage models according to the invention.
Figure 3B:
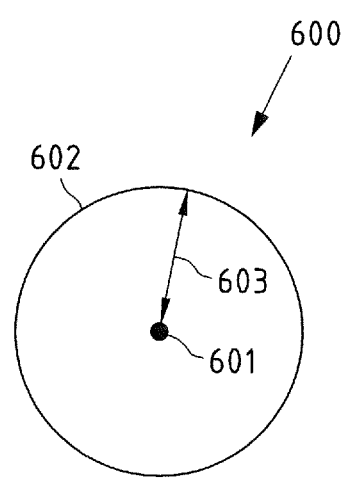

FIGS. 3a and 3b show exemplary radio coverage models 500 and 600 which are geometric models. Radio coverage model 500 of FIG. 3a is a square with center 501, perimeter 502 and edge length 503. Furthermore the shortest distance 504 between the center 501 and the perimeter 502 is illustrated in FIG. 3a. Radio coverage model 600 of FIG. 3b is a circle with center 601, circumference 602 and radius 603. In order to serve as a radio coverage model for a beacon, certain parameter(s) such as the edge length 503 or the diameter 603 of these geometric models 500 and 600 may be determined such that the perimeter 502 and the circumference 602 define a boundary (e.g. a boundary of an area) within which radio signals transmitted or triggered to be transmitted by the beacon (e.g. beacon 200-1 or 200-2 or 200-3) positioned at center 501 or 601 are expected to be observable (e.g. receivable with a minimum quality such as a minimum signal-to-noise ratio and/or a minimum signal power).

For example, the parameter(s) of a geometric model of a radio coverage of a beacon (e.g. beacon 200-1 or 200-2 or 200-3) of system 300 may be selected from a list of parameters according to a predetermined mapping with one or more radio transmission parameters associated with this beacon. For example, edge length 603 is to be selected to be 16m for a beacon of system 300 having a transmission power of 0 dBm and a path loss exponent of 4 according to such a mapping.

To this end, the radio transmission parameters may be extracted from and/or determined based on the observation reports received in step 401. As disclosed above, the reports generated and transmitted by beacons 200-1 to 200-3 which are received in step 401 may additionally contain radio transmission parameters like an indication of a transmission power of a beacon and an indication of received signal strength for a radio positioning support signal. If the installation positions of the beacons (e.g. beacons 200-1 to 200-3) of system 300 and, thus, also the distances between the beacons are known, such radio transmission parameters associated with a radio positioning support device may for example be used to determine (e.g. calculate) further radio transmission parameters like a path loss exponent. Therein, the installation positions of the beacons of system 300 may for example be represented by the previously determined coverage area model of system 300. Alternatively or additionally, the observation reports received in step 401 may contain and/or represent installation positions of one or more beacons (e.g. beacons 200-1 to 200-3) of system 300.

For example, a previously determined coverage area model of system 300 which is represented by information or data stored in program memory 102 of server 100 may be updated in step 402 with the radio coverage models (e.g. geometric models like geometric models 500 or 600) that are determined at least partially based on the observation reports received in step 401. The accordingly determined (updated) coverage area model of system 300 may then be used to determine whether at any position within the coverage area of system 300 at least a predetermined number of different radio positioning support signals is expected to be observable.

Optionally, information or data representing the accordingly determined (updated) coverage area model of system 300 may be stored in program memory 102 of server 100 and/or communicated to mobile devices 301 and 302 (e.g. by optional communication interface 105). Mobile devices 301 and 302 may use (e.g. may be forced to use) such a determined (updated) coverage area model for estimating their position (e.g. in combination with radio positioning support signals received from beacons of system 300). Therein, the determined (updated) coverage area model may allow the mobile devices to estimate their position more accurate (e.g. in comparison to the previously determined coverage area model of system 300, because the determined (updated) coverage area model may better reflect the current radio environment of system 300).

In the following, this is exemplary described in more detail based on FIGS. 4a to 4c. Therein, the same reference signs in FIGS. 4a to 4c are used for the same features.

Figure 4A:
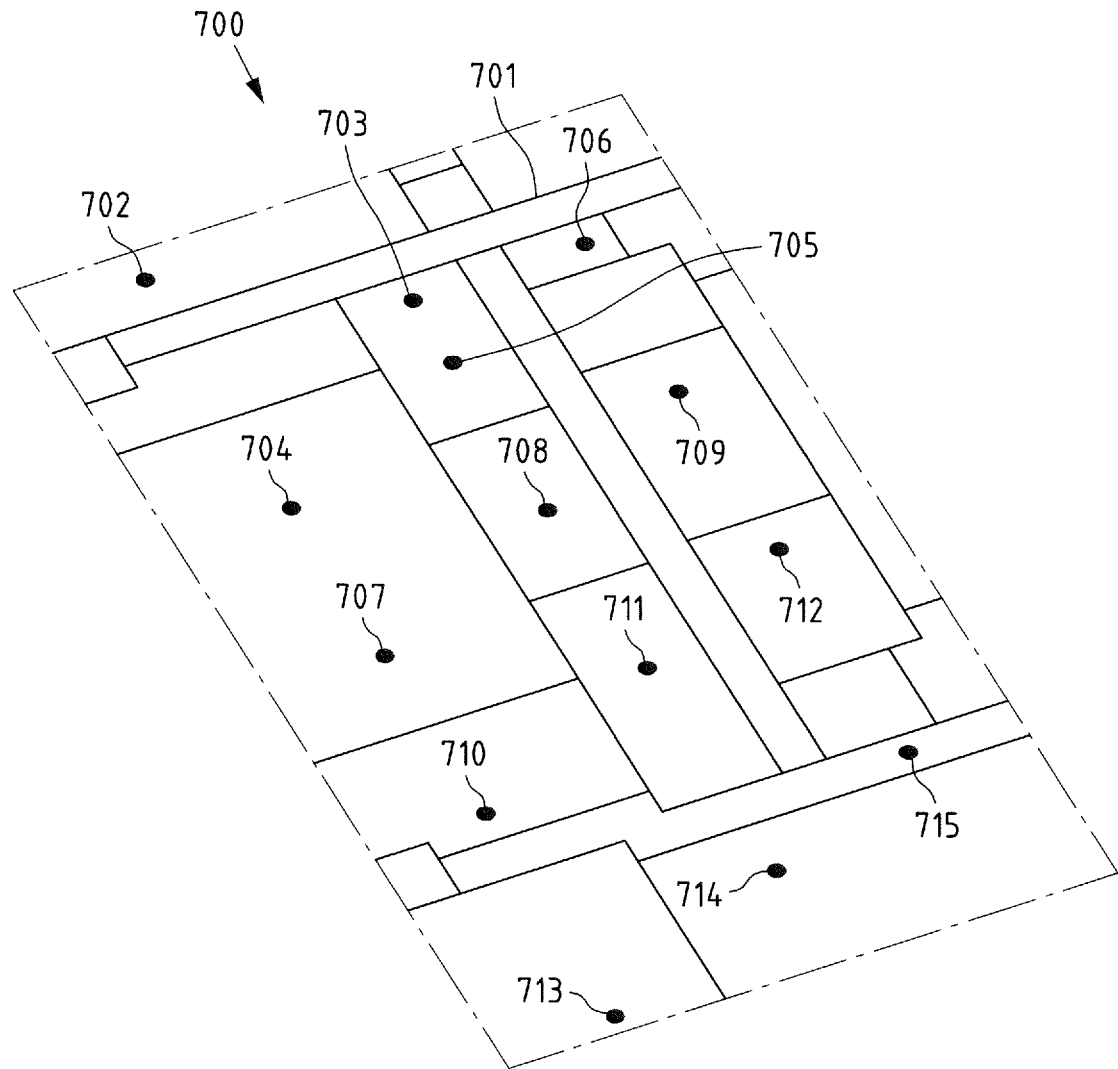
FIGS. 4a-4c show an exemplary section of a coverage area, exemplary radio coverage models, and an exemplary section of a coverage area model according to the invention.

FIG. 4a schematically shows an exemplary section of a coverage area 700 of system 300. The coverage area 700 of system 300 represents an area of a predetermined environment of a building which is indicated by floorplan 701 in FIG. 4a. Installations points of beacons (e.g. beacons 200-1 to 200-3) of system 300 are represented by symbols 702 to 715 in FIG. 4a.

Figure 4B:
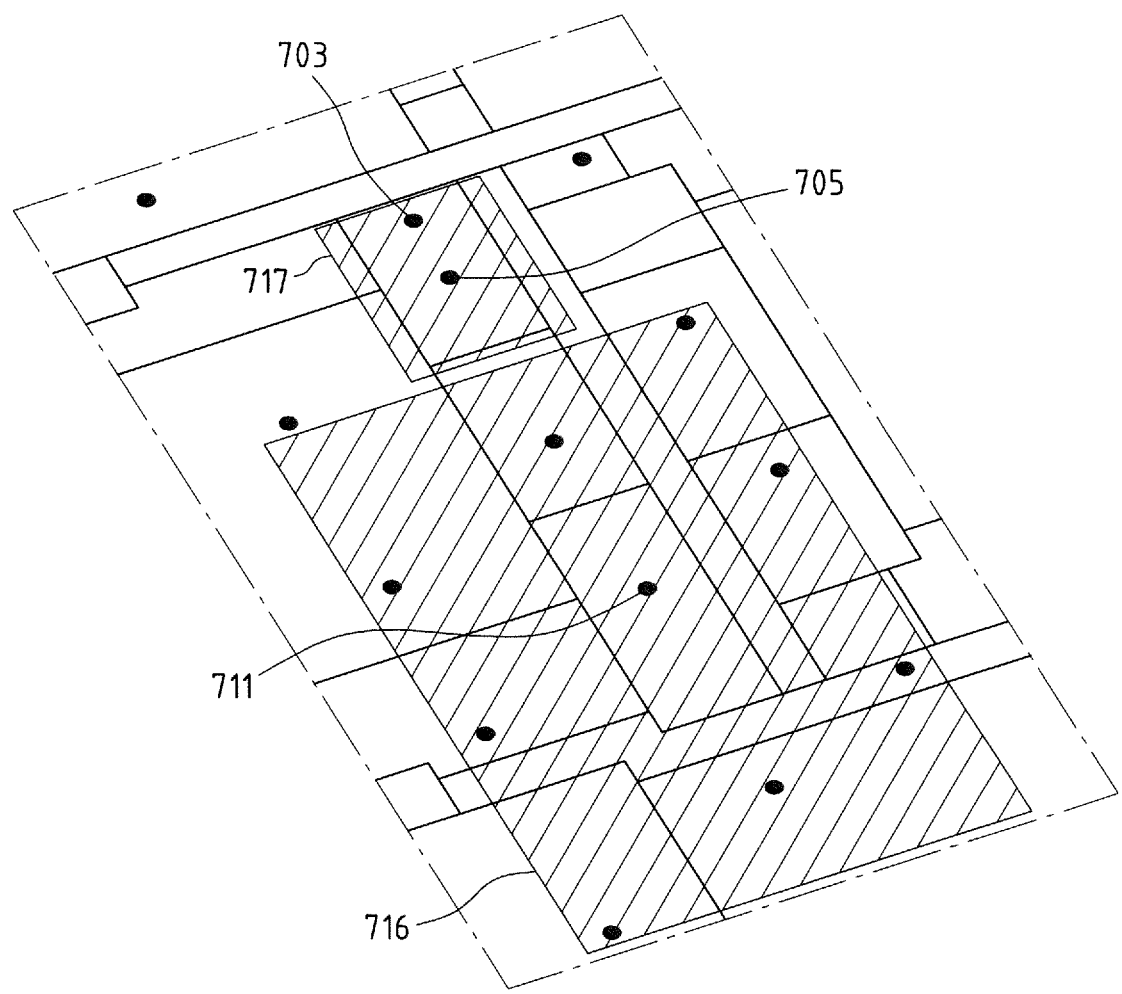
Figure 4C:
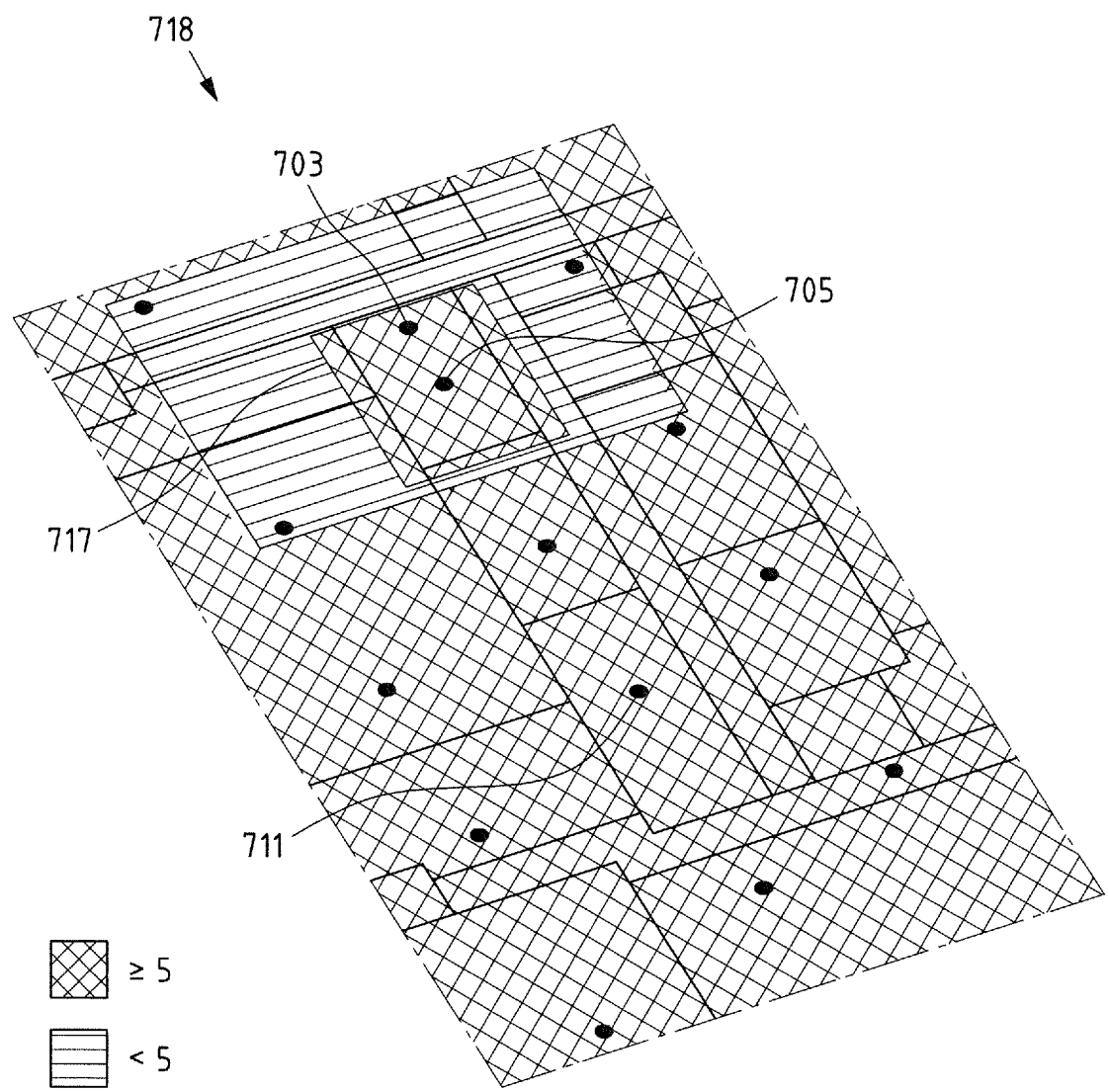

FIG. 4b shows exemplary radio coverage models 716 and 717 for the beacons of system 300 that are installed at the installation points represented by symbols 711 and 705, respectively. Radio coverage models 716 and 717 are geometric models which basically correspond to geometric model 500 of FIG. 3a. Symbol 711 representing one of these installation points is in the center of radio coverage model 716, and symbol 705 representing the other one of these installation points is in the center of radio coverage model 717.

The radio coverage models 716 and 717 have different edge length and, thus, represent different large expected radio coverages for the beacons of system 300 that are installed at the installation points represented by symbols 711 and 705. For example, the radio coverage of the beacon installed at the installation point represented by symbol 705 may be affected by a temporary interference (e.g. presence of a crowd of people) which results in a shrunk radio coverage area, whereas the radio coverage of the beacon installed at the installation point represented by symbol 711 may be not affected by such a temporary interference. This may be also reflected by the observation reports received in step 401 which may be used as a basis for determining the parameters of geometric models 716 and 717. For example, radio positioning support signals transmitted by the beacon installed at the installation point represented by symbol 711 may be observable at the installation positions of the adjacent beacons represented by symbols 707 to 709, 710, 712, and 713 to 715 of FIG. 4a, whereas radio positioning support signals transmitted by the beacon installed at the installation point represented by symbol 705 may be only observable at the installation position of the closest adjacent beacon represented by symbol 703. Accordingly, corresponding observation reports may be generated and transmitted by these adjacent beacons and received in step 401 which may then be used to determine the according parameters of geometric models 716 and 717.

FIG. 4c shows an exemplary section of a coverage area model 718 of system 300 which represents and/or contains radio coverage models for each beacon of system 300 within the section of coverage area 700 as shown in FIG. 4a. Without limiting the scope of the invention, it is assumed in the following that coverage area model 718 represents and/or contains geometric models of the expected radio coverage for each beacon of system 300 corresponding to the geometric model 500 of FIG. 4*a* and as exemplary shown for the beacons of system 300 that are installed at the installation points represented by symbols 711 and 705 in FIG. 4*b*. For illustrative purposes, the boundaries of these radio coverage models are not shown in FIG. 4*c*. However, different specific areas with different specific expected radio coverages of the beacons of system 300 are represented by coverage area model 717 as indicated by different hatchings in FIG. 4*c*. As can be seen from the legend included in FIG. 4*c*, the cross-hatched areas indicate specific areas within which radio coverage models of at least five beacons intersect and, thus, radio signals of at least five beacons are expected to be observable (e.g. receivable with a minimum quality such as a minimum signal-to-noise ratio and/or a minimum signal power). Within the other specific areas less than five beacons are expected to be observable (e.g. receivable with a minimum quality such as a minimum signal-to-noise ratio and/or a minimum signal power). Accordingly, if the predetermined radio positioning support criterion requires that that at any position within the coverage area of system 300 at least a predetermined number of five different radio positioning support signals is expected to be observable, it may be determined based on the coverage area model 718 shown in FIG. 4*c* that the predetermined radio positioning support criterion is not met. If it is determined that the predetermined radio positioning support criterion is not met by system 300, one or more specific positions and/or one or more specific areas (e.g. the non-cross-hatched areas of coverage area model 718 shown in FIG. 4*c*) which do not meet the predetermined radio positioning support may be obtained as a result of the determining.

In step 403, if it is determined in step 402 that the predetermined radio positioning support criterion is not met by system 300, server 100 at least partially reconfigures and/or causes at least partially reconfiguring system 300.

At least partially reconfiguring system 300 may be understood to mean that a transmission parameter of one or more beacons of system 300 is adapted. An example of such a transmission parameter is a transmission power, a modulation scheme or a channel code. Accordingly, server 100 may cause at least partially reconfiguring system 300 in step 403 by controlling at least partially reconfiguring system 300, for example by determining and transmitting control information to one or more beacons of system 300 which cause the one or more beacons to reconfigure themselves (e.g. to adapt a transmission parameter like a transmission power). Considering the exemplary coverage area model 718 shown in FIG. 4*c*, server 100 may for example determine and transmit control information to the beacon installed at the installation position represented by symbol 705 causing this beacon to increase its transmission power and, thus, to extend its radio coverage.

Alternatively or additionally, at least partially reconfiguring system 300 may be understood to mean that a potential installation position and/or a potential installation area for installing an additional beacon is determined. Considering the exemplary coverage area model 718 shown in FIG. 4*c*, such a potential installation area for installing one or more additional beacons may for example corresponds to the specific non-cross hatched area of coverage area model 718. Accordingly, server 100 may cause at least partially reconfiguring system 300 in step 403 by determining and outputting (e.g. by displaying on a graphical user interface) according installation information. For example, such installation information may represent coverage area model 718 as shown in FIG. 4*c*.

The method of flowchart 400 may be an iterative method which may need one or more iterations before the predetermined radio positioning support criterion is met by system 300. For a predetermined number of first iterations, system 300 may for example be reconfigured in step 403 by adapting and/or causing adapting one or more radio parameters of one or more beacons of system 300; and after the predetermined number of first iterations or if no further adapting of one or more radio parameters of one or more beacons of system 300 is possible (e.g. because the maximum transmission power is reached), system 300 may be reconfigured in step 403 by determining a potential installation position and/or a potential installation area for installing an additional beacon.

Figure 5:
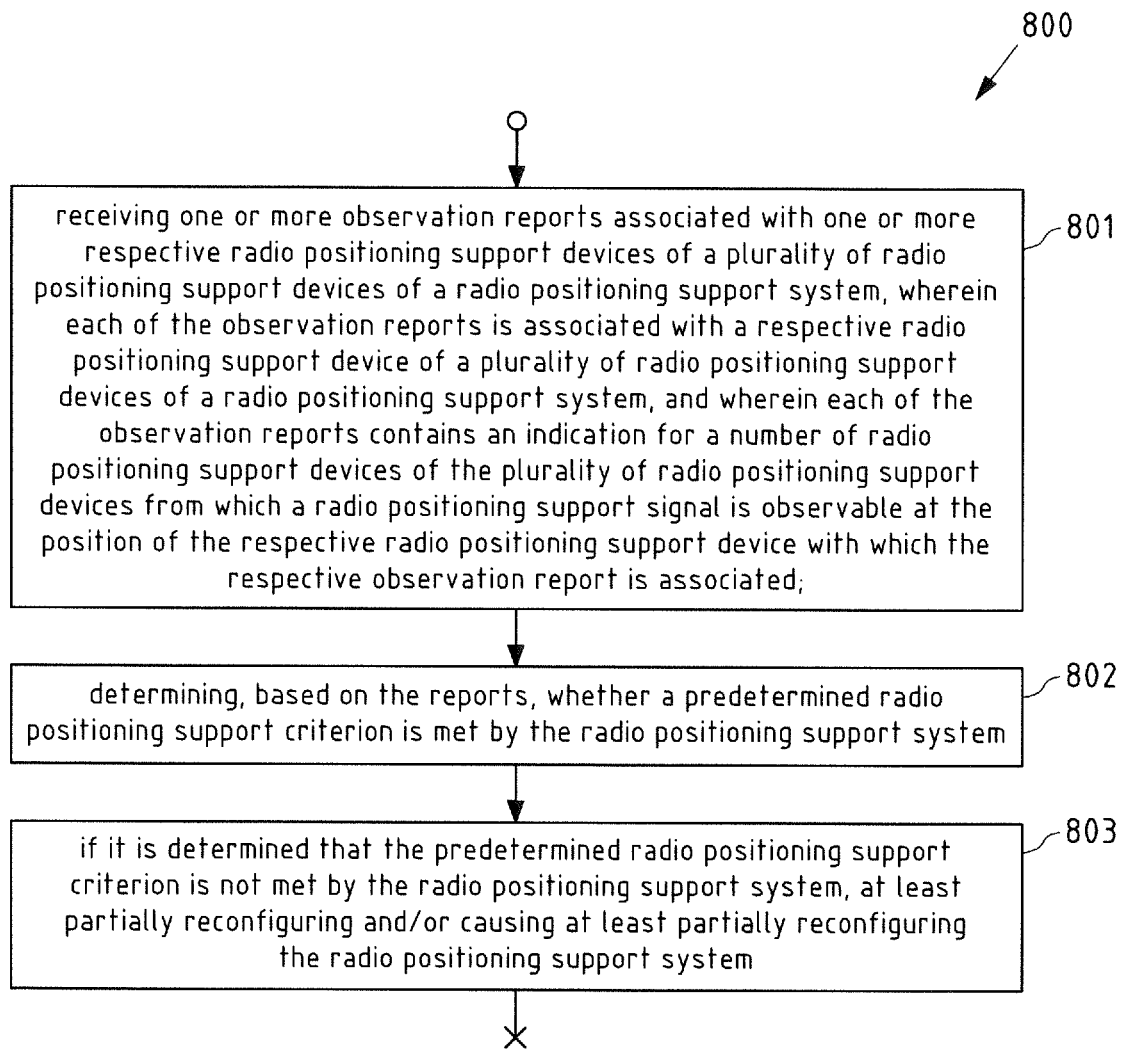
FIG. 5 is a flow chart illustrating another exemplary embodiment of a method according to the invention.

FIG. 5 is a flow chart 800 illustrating another exemplary embodiment of a method according to the invention. Without limiting the scope of the invention, it is assumed in the following that beacon 201-1 of system 300 as described above with respect to FIGS. 1*b* and 1*c* performs steps 801 to 803 of flow chart 800.

In step 801, one or more observation reports associated with one or more respective radio positioning support devices of a plurality of radio positioning support devices of system 300 are received by beacon 200-1. The radio positioning support devices may for example be beacons 200-2 and 200-3 of system 300, and the one or more observation reports are observation reports generated and transmitted by beacons 200-2 and 200-3, wherein the observation reports contain at least an indication for a number of beacons of system 300 from which a radio positioning support signal is observable at the position of the respective beacon as described above.

In step 802, beacon 200-1 determines, based on the observation reports received in step 801, whether a predetermined radio positioning support criterion is met by system 300.

As disclosed above, the predetermined radio positioning support criterion may be selected such that system 300 enables mobile devices to estimate their positions with a predetermined minimum accuracy within a coverage area of system 300 if the predetermined radio positioning support criterion is met.

The predetermined radio positioning support criterion may require that that at any position within the coverage area of system 300 at least a predetermined number of different radio positioning support signals is expected to be observable. Accordingly, the determining in step 802 may involve determining whether at one or more predetermined positions (e.g. the installation positions of beacons 200-1 to 200-3) within the coverage area of system 300 less than the predetermined number of different radio positioning support signals is expected to be observable.

For example, if at least one of the observation reports received in step 801 contains an (e.g. qualitative or quantitative) indication that the number of beacons of system 300 from which a radio positioning support signal is observable at an installation position of beacons 200-2 or beacon 200-3 is less than the predetermined number of different radio positioning support signals, it may be determined in step 802 that the predetermined radio positioning support criterion is not met.

As described above, beacons 200-1 to 200-3 may be part or may form a PAN, wherein beacon 200-1 may be nominated as PAN coordinator. Accordingly, beacon 200-1 may only consider observation reports received from beacons of this PAN for determining whether the predetermined radio positioning support criterion is met by system 300 in step 802. In other words, beacon 200-1 may only determine whether the predetermined radio positioning support criterion is (not) met by this PAN in step 802.

In step 803, if it is determined in step 802 that the predetermined radio positioning support criterion is not met by system 300, beacon 200-1 at least partially reconfigures and/or causes at least partially reconfiguring system 300.

At least partially reconfiguring system 300 may be understood to mean that a transmission parameter of one or more beacons of system 300 is adapted. An example of such a transmission parameter is a transmission power, a modulation scheme or a channel code. Alternatively or additionally, at least partially reconfiguring system 300 may be understood to mean that a potential installation position and/or a potential installation area for installing an additional beacon is determined.

The method of flowchart 800 may be an iterative method which may need one or more iterations before the predetermined radio positioning support criterion is met by system 300. For a predetermined number of first iterations, beacon 200-1 may for example adapt and/or cause adapting one or more radio transmission parameters of one or more (e.g. all) beacons (e.g. beacons 200-1 to 200-3) which are part and/or which form the PAN which is coordinated by beacon 200-1 as PAN coordinator in step 803. For example, certain settings for one or more transmission power parameters like certain transmission power levels may be predefined. Beacon 200-1 may for example increase and/or cause increasing the transmission power of the one or more (e.g. all) beacons of the PAN to the next transmission power level (e.g. at least partially by determining and transmitting corresponding control information to beacon 200-2 and 200-3) in step 803. After the predetermined number of first iterations or when the transmission power of the beacons of the PAN corresponds to the maximum transmission power level, beacon 200-1 may for example determine a potential installation area for installing an additional beacon in step 803. Therein, the area defined by the installation positions (e.g. an area which comprises the installations positions) of beacons 200-1 to 200-3 of the PAN and/or a coverage area of the PAN may be determined as potential installation area in step 803. For example, beacon 200-1 may generate and transmit corresponding information to server 100 of system 300 (e.g. information causing server 100 to inform a user, e.g. by displaying the determined potential installation area or an information indicating the area defined by the installation positions (e.g. an area which comprises the installations positions) of beacons 200-1 to 200-3 of the PAN and/or a coverage area of the PAN on a graphical user interface as a potential installation position).

To summarize, the present invention proposes a method for detecting changes in radio environment and for finding optimum configuration for radio positioning support system like system 300. To maintain good quality positioning, beacons may be reconfigured and an updated coverage area model may be determined.

An exemplary aspect of the invention relate to a radio positioning support system (e.g. system 300 as described above with respect to FIG. 1*c*) comprising a plurality of beacons (e.g. beacons 200-1 to 200-3) and a hub or a server (e.g. server 100). The beacons may for example also referred to as mirror beacons which advertise position, unique address of surrounding beacons and their received signal strength (RSS) received by it (e.g. this information may be provided in the form of observation reports as described above). A hub or a server (e.g. server 100) can collect all mirror beacon advertisements.

For example, changes in radio environment may be detected by collecting the mirror beacon advertisements (e.g. step 401 as described above with respect to FIG. 2) and process it to track changes in radio coverage of beacons (e.g. step 402). The mirror beacon advertisement may be used to get real time information on radio coverage of each beacon (e.g. beacons 200-1 to 200-3). Tracking the radio coverages of beacons may for example be used to detect changes in radio environment which are exemplary explained below:

change in beacon position: The radio coverage will be displaced from its previous location presence of crowd of people and/or interference: radio coverage of the beacons will shrink in the presence of crowd and/or interference hardware failure: beacon is not detected by surrounding (e.g. adjacent) beacons To find best configuration, a positioning criterion may be used. The positioning criterion may be set minimum number of beacons received at one location to provide good positioning. Based on received mirror beacon advertisements, the hub or server (e.g. server 100) may create (e.g. determine) radio coverage models of beacons (e.g. step 401). The hub or server may check if the coverage area of the radio positioning support system (e.g. system 300) is meeting the positioning criterion by intersecting the radio coverage models and checking if the radio positioning support system is meeting positioning criterion (e.g. step 402). If the positioning criterion is not meet, the hub may reconfigure the beacons so that it meets the positioning criterion (e.g. step 403).

This process may take a few iterations. The process can also indicate if it fails to meet positioning criterion with available beacons and new beacons must be added to meet positioning criterion.

Alternatively or additionally, a beacon may determine (e.g. check) the number of beacons from which it receives a radio positioning support signal in it scans and may only transmit an observation report if it is determined that less than a predetermined number of radio positioning support signals is observable at the position of this beacon. From receiving such an observation report, it may be concluded that the positioning criterion is not met at the position of this beacon. Accordingly, the process will only be started if there is a problem in the system (e.g. the positioning criterion is not met by the system).

These observation reports may for example be used in embodiments where beacons (e.g. beacons 200-1 to 200-3) are grouped in small Personal Area Networks (PANs) and/or clusters based on the coverage. Each cluster may control and/or adapt its transmission power to meet the positioning criterion. Beacons of a PAN or a cluster themselves may select a PAN or cluster coordinator (e.g. a center device) by setting up a PAN and nominating one beacon to behave as coordinator (e.g. beacon 200-1). The coverage can be extended by meshing two or more PAN networks.

If the positioning criteria is not met by such a PAN and/or cluster. It may increase the transmission power to the next predefined transmission power level to achieve that the affected area met the positioning criterion. If after increasing the transmission power the positioning criterion is met, then the new transmission power level may be use as the default transmission power level for all beacons in the cluster and/or the PAN. If increasing the transmission power does not help or the transmission power is increased to the predefined maximum transmission power level, then the PAN and/or cluster coordinator may report that additional beacons should be added into this area. There may be one central device (e.g. server 100) which collects such reports of a cluster and/or PAN coordinator and sends the collective information to a user (e.g. a system integrator) which acts on the information. The advantage may for example be that the system can made the changes (e.g. adapting transmission parameters) relatively easily and analysis do not have to run repeatedly. This process may take a few iterations.

Figure 6:
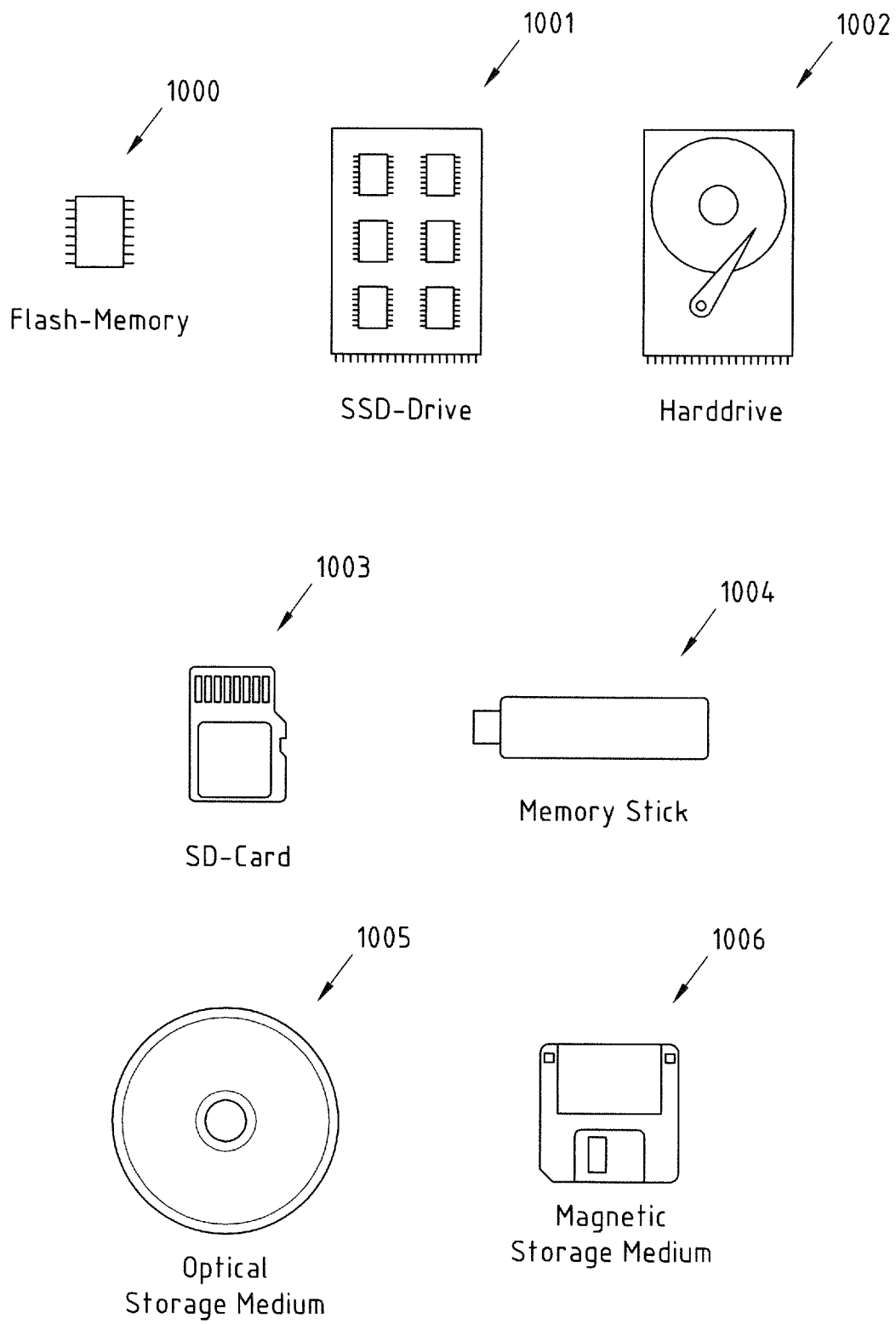
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement program memory 102 of FIG. 1*a* or memory 202 of FIG. 1*b*. To this end, FIG. 5 displays a flash memory 1000, which may for instance be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for instance a CD-ROM or DVD) and a magnetic storage medium 1006.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 101 and 201 of FIGS. 1*a* and 1*b*, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method performed by an apparatus, said method comprising:

receiving one or more observation reports, wherein each of said observation reports is associated with a respective radio positioning support device of a plurality of radio positioning support devices of a radio positioning support system, and wherein each of said observation reports contains an indication for a number of radio positioning support devices of said plurality of radio positioning support devices and/or for each radio positioning support device of said plurality of radio positioning support devices from which a radio positioning support signal is observable at a position of said respective radio positioning support device with which said respective observation report is associated;

determining, based on said observation reports, whether a predetermined radio positioning support criterion is met by said radio positioning support system, wherein said predetermined radio positioning support criterion corresponds to a number of different radio positioning support signals expected to be observable at least one position within a coverage area of the radio positioning support system; and when it is determined that said predetermined radio positioning support criterion is not met by said radio positioning support system, at least partially reconfiguring and/or causing at least partially reconfiguring of said radio positioning support system.

2. The method according to claim 1, wherein said method further comprises:

determining, at least partially based on said observation reports, whether at any position within said coverage area of said radio positioning support system at least a predetermined number of different radio positioning support signals is observable, and/or determining, at least partially based on said observation reports, whether at one or more positions within said coverage area of said radio positioning support system less than said predetermined number of different radio positioning support signals is observable.

3. The method according to claim 2, wherein said predetermined number of different radio positioning support signals is set to three, four, five or ten.

4. The method according to claim 2, wherein said predetermined radio positioning support criterion is met when it is determined that at any position within said coverage area of said radio positioning support system at least said predetermined number of different radio positioning support signals is observable, and/or wherein said predetermined radio positioning support criterion is not met when it is determined that at one or more positions within said coverage area of said radio positioning support system less than said predetermined number of different radio positioning support signals is observable.

5. The method according to claim 1, wherein said method further comprises:
   determining, at least partially based on said observation reports, a coverage area model of said radio positioning support system.

6. The method according to claim 5, wherein said coverage area model of said radio positioning support system contains or represents a respective radio coverage model for each radio positioning support device of said plurality of radio positioning support devices.

7. The method according to claim 6, wherein each of said respective radio coverage models is one of:
   a polygon;
   a rectangle and/or a square;
   a cuboid and/or a cube;
   an ellipse and/or a circle; and
   an ellipsoid and/or a sphere.

8. The method according to claim 1, wherein said at least partially reconfiguring said radio positioning support system comprises:
   adapting a transmission parameter of one or more radio positioning support devices of said plurality of radio positioning support devices.

9. The method according to claim 1, wherein said at least partially reconfiguring said radio positioning support system comprises:
   determining a potential installation position and/or a potential installation area for installing an additional radio positioning support device.

10. The method according to claim 1, wherein one or more radio positioning support devices of said plurality of radio positioning support devices are one of:
    a Bluetooth beacon;
    a Bluetooth beacon enabling Bluetooth low energy mode;
    a Bluetooth low energy beacon; and
    an access point of a wireless local area network.

11. The method according to claim 1, wherein each radio positioning support device of said plurality of radio positioning support devices is installed at a fixed installation position.

12. The method according to claim 1, wherein said apparatus is or is part of a radio positioning support device of said plurality of radio positioning support devices or a server of said radio positioning support system or a hub of said radio positioning support system.

13. A non-transitory computer readable storage medium in which computer program code is stored, the computer program code when executed by a processor causing at least one apparatus to perform:
    receiving one or more observation reports, wherein each of said observation reports is associated with a respective radio positioning support device of a plurality of radio positioning support devices of a radio positioning support system, and wherein each of said observation reports contains an indication for a number of radio positioning support devices of said plurality of radio positioning support devices and/or for each radio positioning support device of said plurality of radio positioning support devices from which a radio positioning support signal is observable at a position of said respective radio positioning support device with which said respective observation report is associated;
    determining, based on said observation reports, whether a predetermined radio positioning support criterion is met by said radio positioning support system, wherein said predetermined radio positioning support criterion corresponds to a number of different radio positioning support signals expected to be observable at least one position within a coverage area of the radio positioning support system; and
    when it is determined that said predetermined radio positioning support criterion is not met by said radio positioning support system, at least partially reconfiguring and/or causing at least partially reconfiguring of said radio positioning support system.

14. An apparatus, said apparatus comprising at least one processor and at least one memory including computer program code, the at least one memory and the computer program code configured to, with the at least one processor, cause said apparatus at least to perform:
    receiving one or more observation reports, wherein each of said observation reports is associated with a respective radio positioning support device of a plurality of radio positioning support devices of a radio positioning support system, and wherein each of said observation reports contains an indication for a number of radio positioning support devices of said plurality of radio positioning support devices and/or for each radio positioning support device of said plurality of radio positioning support devices from which a radio positioning support signal is observable at a position of said respective radio positioning support device with which said respective observation report is associated;
    determining, based on said observation reports, whether a predetermined radio positioning support criterion is met by said radio positioning support system, wherein said predetermined radio positioning support criterion corresponds to a number of different radio positioning support signals expected to be observable at least one position within a coverage area of the radio positioning support system; and
    when it is determined that said predetermined radio positioning support criterion is not met by said radio positioning support system, at least partially reconfiguring and/or causing at least partially reconfiguring of said radio positioning support system.

15. The apparatus according to claim 14, wherein the at least one memory and the computer program code are further configured to, with the at least one processor, cause said apparatus to:
    determine, at least partially based on said observation reports, whether at any position within said coverage area of said radio positioning support system at least a predetermined number of different radio positioning support signals is observable, and/or
    determine, at least partially based on said observation reports, whether at one or more positions within said coverage area of said radio positioning support system less than said predetermined number of different radio positioning support signals is observable.

16. The apparatus according to claim 14, wherein said predetermined radio positioning support criterion is met when it is determined that at any position within said coverage area of said radio positioning support system at least said predetermined number of different radio positioning support signals is observable, and/or wherein said predetermined radio positioning support criterion is not met when it is determined that at one or more positions within said coverage area of said radio positioning support system less than said predetermined number of different radio positioning support signals is observable.

17. The apparatus according to claim 14, wherein the at least one memory and the computer program code are further configured to, with the at least one processor, cause said apparatus to:
determine, at least partially based on said observation reports, a coverage area model of said radio positioning support system.

18. The apparatus according to claim 17, wherein said coverage area model of said radio positioning support system contains or represents a respective radio coverage model for each radio positioning support device of said plurality of radio positioning support devices.

19. The apparatus according to claim 14, wherein the at least one memory and the computer program code are configured to, with the at least one processor, cause said apparatus to at least partially reconfigure said radio positioning support system by adapting a transmission parameter of one or more radio positioning support devices of said plurality of radio positioning support devices.

20. The apparatus according to claim 14, wherein the at least one memory and the computer program code are configured to, with the at least one processor, cause said apparatus to at least partially reconfigure said radio positioning support system by determining a potential installation position and/or a potential installation area for installing an additional radio positioning support device.

* * * * *

UNITED STATES PATENT AND TRADEMARK OFFICE
CERTIFICATE OF CORRECTION

PATENT NO. : 11,422,218 B2
APPLICATION NO. : 16/638490
DATED : August 23, 2022
INVENTOR(S) : Muhammad Irshan Khan et al.

It is certified that error appears in the above-identified patent and that said Letters Patent is hereby corrected as shown below:

In the Claims

In Column 30, Line 41, Claim 1, delete "at least" and insert -- at at least --, therefor.

In Column 32, Line 8, Claim 13, delete "at least" and insert -- at at least --, therefor.

In Column 32, Line 39, Claim 14, delete "at least" and insert -- at at least --, therefor.

Signed and Sealed this
Twelfth Day of September, 2023

Katherine Kelly Vidal
*Director of the United States Patent and Trademark Office*